US012683189B1

(12) United States Patent
Hakeem et al.

(10) Patent No.: US 12,683,189 B1
(45) Date of Patent: Jul. 14, 2026

(54) OXYNITRIDE CERAMIC MATERIAL WITH LITHIUM ADDITION

(71) Applicant: KING FAHD UNIVERSITY OF PETROLEUM AND MINERALS, Dhahran (SA)

(72) Inventors: Abbas Saeed Hakeem, Dhahran (SA); Bilal Anjum Ahmed, Dhahran (SA); Sharafat Ali, Dhahran (SA); Natalia Anna Wojcik, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/394,660

(22) Filed: Nov. 19, 2025

(30) Foreign Application Priority Data

Nov. 11, 2025 (SA) ................................. 1020258371

(51) Int. Cl.
  H01B 1/14 (2006.01)
  C03B 19/06 (2006.01)
  (Continued)

(52) U.S. Cl.
  CPC ....... H01M 10/0562 (2013.01); C03B 19/063 (2013.01); C03C 14/004 (2013.01);
  (Continued)

(58) Field of Classification Search
  CPC .. H01B 1/00; H01B 1/08; H01B 1/14; H01M 10/0561; C03B 19/06; C03C 4/14; C03C 14/004
  See application file for complete search history.

(56) References Cited

U.S. PATENT DOCUMENTS 12,132,167 B2 * 10/2024 Zhu ..................... H01M 10/052
2022/0393301 A1 12/2022 Byrne et al.

FOREIGN PATENT DOCUMENTS

CN 103943880 A 7/2014
CN 107488039 A 12/2017
(Continued)

OTHER PUBLICATIONS

Ali et al "A novel approach for processing CaAlSiON glass-ceramics by spark plasma sintering: Mechanical and electrical properties", Journal of the European Ceramic Society 42 (2022) 96-104.*

(Continued)

*Primary Examiner* — Mark Kopec
(74) *Attorney, Agent, or Firm* — Oblon, McClelland, Maier & Neustadt, L.L.P.

(57) ABSTRACT

An oxynitride ceramic material includes a $Ca_{7-8}Al_{15-15.5}Si_{17-18}O_{56-57}N_{5-6}$ material and a $Li_{6-4}La_3Zr_{1.4}Ta_{0.6}O_{12}$ material in an amount of 10 to 80 percent by weight (wt. %) based on a total weight of the oxynitride ceramic material. The oxynitride ceramic material is crystalline and includes phases including a lanthanum zirconium oxide ($La_2Zr_2O_7$) phase, a lanthanum tantalum oxynitride ($LaTaON_2$) phase, a lithium aluminate ($LiAlO_2$) phase, a zirconium silicate ($ZrSiO_2$) phase, and a lithium aluminosilicate ($LiAlSi_3O_8$) phase.

20 Claims, 19 Drawing Sheets

(51) Int. Cl.

| | |
|---|---|
| *C03C 14/00* | (2006.01) |
| *C04B 35/488* | (2006.01) |
| *C04B 35/626* | (2006.01) |
| *C04B 35/64* | (2006.01) |
| *C04B 35/653* | (2006.01) |
| *H01M 10/0562* | (2010.01) |
| *H01M 10/42* | (2006.01) |

(52) U.S. Cl.
CPC ........ *C04B 35/488* (2013.01); *C04B 35/6261* (2013.01); *C04B 35/64* (2013.01); *C04B 35/653* (2013.01); *H01B 1/14* (2013.01); *H01M 10/4235* (2013.01); *C03C 2214/04* (2013.01); *C03C 2214/30* (2013.01); *C04B 2235/3248* (2013.01); *C04B 2235/36* (2013.01); *C04B 2235/6562* (2013.01); *C04B 2235/6581* (2013.01); *C04B 2235/666* (2013.01); *H01M 2300/0068* (2013.01)

(56) References Cited

FOREIGN PATENT DOCUMENTS

| | | |
|---|---|---|
| CN | 112768695 A | 5/2021 |
| CN | 112194372 B | 7/2022 |

OTHER PUBLICATIONS

Abbas et al "Unravelling the electrical and thermal behaviour of as-synthesised oxynitride glass-ceramic/ LLZTO composite through spark plasma sintering", Ceramics International; Accepted Jan. 4, 2026; available online Jan. 6, 2026.*

Doktor der Naturwissenschaften, "Surface and interface properties of glass-ceramic garnet-type solid electrolytes for the application in solid-state batteries", Sep. 11, 2023; pp. 1-156.

Nina Hoinkis, et al., "Amorphous Phase Induced Lithium Dendrite Suppression in Glass-Ceramic Garnet-Type Solid Electrolytes", ACS Applied Materials & Interfaces, vol. 15, Issue 23, May 30, 2023, pp. 28692-28704 (2 Pages) (Abstract Only).

* cited by examiner

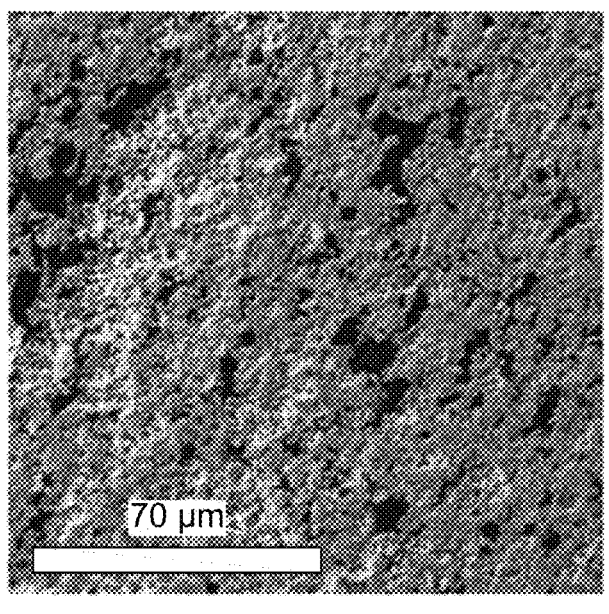
FIG. 4A
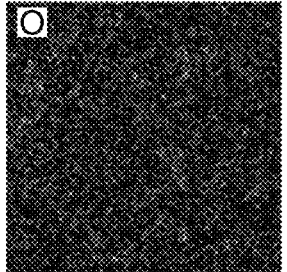
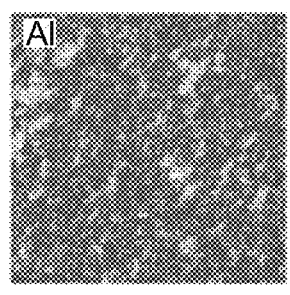
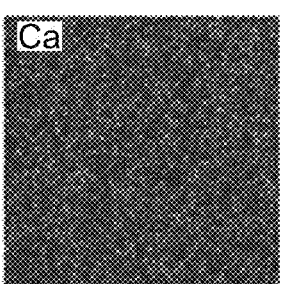
FIG. 4B          FIG. 4C          FIG. 4D Li1: $E_{A1}$ = 0.89 eV $E_{A2}$ = 0.99 eV
Li2: $E_{A1}$ = 0.75 eV $E_{A2}$ = 0.86 eV
Li2: $E_{A1}$ = 0.72 eV $E_{A2}$ = 0.82 eV
Li4: $E_{A1}$ = 0.89 eV $E_{A2}$ = 0.84 eV
Li5: $E_{A1}$ = 0.91 eV $E_{A2}$ = 1.02 eV Li1: $E_{A1}$ = 0.89 eV $E_{A2}$ = 0.99 eV
Li2: $E_{A1}$ = 0.75 eV $E_{A2}$ = 0.86 eV
Li2: $E_{A1}$ = 0.72 eV $E_{A2}$ = 0.82 eV
Li4: $E_{A1}$ = 0.89 eV $E_{A2}$ = 0.84 eV
Li5: $E_{A1}$ = 0.91 eV $E_{A2}$ = 1.02 eV

OXYNITRIDE CERAMIC MATERIAL WITH LITHIUM ADDITION

CROSS-REFERENCE TO RELATED APPLICATION

The present disclosure claims the benefit of Saudi Patent Application No. 1020258371, filed Nov. 11, 2025, with the Saudi Authority for Intellectual Property Office, which is incorporated herein by reference in its entirety.

STATEMENT OF ACKNOWLEDGEMENT

Support provided by King Fahd University of Petroleum and Minerals, Saudi Arabia, through project INSE2423 is gratefully acknowledged.

BACKGROUND

Technical Field

The present disclosure is directed towards an oxynitride ceramic material, and more particularly towards an oxynitride ceramic material including a $Ca_{7-8}Al_{15-15.5}Si_{17-18}O_{56-57}N_{5-6}$ material and a $Li_{6.4}La_3Zr_{1.4}Ta_{0.6}O_{12}$ material.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Lithium-ion batteries currently dominate the market due to their high energy density and widespread use in portable electronics and electric vehicles; however, the push toward higher energy density using lithium metal anodes faces challenges. The formation of lithium dendrites can penetrate separators, leading to short circuits and severe safety hazards. Conventional liquid electrolytes also suffer from thermal instability, flammability, and side reactions at extreme temperatures, limiting battery lifespan and operational reliability. These safety and stability concerns highlight the need for alternative electrolyte systems that can support high-energy-density applications while minimizing risk.

Solid-state electrolytes (SSEs) have emerged as alternatives to traditional liquid electrolytes because they can serve as both electrolytes and separators, offering improved mechanical strength, chemical stability, and resistance to dendrite penetration. Despite these advantages, SSEs are limited by lower ionic conductivity compared to liquid electrolytes, which restricts efficient lithium ion transport. Different types of SSEs, including organic polymers, inorganic ceramics, and composites, present challenges such as polymers often lack thermal and mechanical stability, and inorganic ceramics can be brittle and suffer from grain boundary resistance and interfacial issues with electrodes. Controlling phase formation, crystallinity, and lithium distribution in inorganic electrolytes remains a challenge for practical application.

Glass-ceramics, a subclass of inorganic SSEs, show potential due to their enhanced strength, thermal stability, and chemical resistance; however, determining enhanced properties requires precise control over heat treatment and composition, as minor variations can greatly impact ionic conductivity and mechanical performance. Integrating high-conductivity materials into glass-ceramic matrices is further complicated by phase interactions, lithium migration, and mechanical stress during battery cycling. Overall, limitations in ionic transport, structural stability, and process control continue to hinder the realization of reliable, high-energy-density solid-state batteries.

Accordingly, an objective of the present disclosure is directed towards an oxynitride ceramic material that exhibits enhanced mechanical strength, thermal stability, and ionic conductivity, overcoming limitations in the art, for high-performance energy and sensing applications.

SUMMARY

In an exemplary embodiment, an oxynitride ceramic material is described. The oxynitride ceramic material includes a $Ca_{7-8}Al_{15-15.5}Si_{17-18}O_{56-57}N_{5-6}$ material and a $Li_{6.4}La_3Zr_{1.4}Ta_{0.6}O_{12}$ material in an amount of 10 to 80 percent by weight (wt. %) based on a total weight of the oxynitride ceramic material. The oxynitride ceramic material is crystalline and includes phases including a lanthanum zirconium oxide ($La_2Zr_2O_7$) phase, a lanthanum tantalum oxynitride ($LaTaON_2$) phase, a lithium aluminate ($LiAlO_2$) phase, a zirconium silicate ($ZrSiO_2$) phase, and a lithium aluminosilicate ($LiAlSi_3O_8$) phase.

In some embodiments, the oxynitride ceramic material has a density of 2.7 to 4 $g/cm^3$.

In some embodiments, the oxynitride ceramic material has a thermal conductivity of 1.5 to 1.8 $W/m \cdot K$.

In some embodiments, the oxynitride ceramic material has a thermal expansion of 4.7 to 5.6 ppm/° C.

In some embodiments, the oxynitride ceramic material has a first activation energy of 0.7 to 1 eV.

In some embodiments, the oxynitride ceramic material has a second activation energy of 0.8 to 1.1 eV.

In some embodiments, the oxynitride ceramic material includes nodules having a diameter of 0.1 to 5 μm and voids having a length of 5 to 50 μm.

In some embodiments, ions are transported within the oxynitride ceramic material via correlated barrier hopping.

In some embodiments, the oxynitride ceramic material includes the $La_2Zr_2O_7$ phase in an amount of at least 20 wt. % based on a total weight of the phases.

In some embodiments, the oxynitride ceramic material includes the $Li_{6.4}La_3Zr_{1.4}Ta_{0.6}O_{12}$ material in an amount of 75 wt. % based on a total weight of the oxynitride ceramic material.

In some embodiments, the oxynitride ceramic material has a density of 3.8 to 4 $g/cm^3$.

In some embodiments, the oxynitride ceramic material has a thermal conductivity of 1.5 to 1.7 $W/m \cdot K$.

In some embodiments, the oxynitride ceramic material has a thermal expansion of 4.8 to 5 ppm/° C.

In some embodiments, the oxynitride ceramic material has a first activation energy of 0.85 to 0.95 eV.

In some embodiments, the oxynitride ceramic material has a second activation energy of 0.97 to 1.07 eV.

In some embodiments, a method of preparing the oxynitride ceramic material is described.

The method includes mixing the $Ca_{7-8}Al_{15-15.5}Si_{17-18}O_{56-57}N_{5-6}$ material and the $Li_{6.4}La_3Zr_{1.4}Ta_{0.6}O_{12}$ material with a probe sonicator for 30 to 90 minutes to form a homogenous mixture. The method further includes sintering the homogeneous mixture in a die at a temperature of 850 to 950° C. for 20 to 40 minutes to form the oxynitride ceramic material. In some embodiments, the sintering is spark plasma sintering and a heating rate during the sintering is 80 to 120° C./min.

In some embodiments, the die is pressurized to 25 to 35 MPa.

In some embodiments, the die is placed in a vacuum having a pressure of $4 \times 10^{-2}$ to $5 \times 10^{-2}$ mbar during the sintering.

In some embodiments, the method of preparing the oxynitride ceramic material further includes melting and casting $Ca_{7.5} Al_{15.1} Si_{17.5}O_{56.5}N_{5.5}$ at a temperature of 1600 to 1700° C. to form a $Ca_{7-8}Al_{15.1}Si_{17.5}O_{56.5}N_{5.5}$ glass before the mixing.

In some embodiments, the method of preparing the oxynitride ceramic material further includes ball-milling the $Ca_{7.5}Al_{15.1}Si_{17.5}O_{56.5}N_{5.5}$ glass for 4 to 8 hours to form the $Ca_{7.5} Al_{15.1} Si_{17.5}O_{56.5}N_{5.5}$ material before the mixing. In some embodiments, the $Ca_{7.5}Al_{15.1}Si_{17.5}O_{56.5}N_{5.5}$ material is a powder.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4A depicts an energy dispersive X-ray spectroscopy (EDX) mapping of L5 with a scale of 70 μm, according to certain embodiments.

FIG. 4B is an EDX mapping of L5 depicting oxygen (O), according to certain embodiments.

FIG. 4C is an EDX mapping of L5 depicting aluminum (Al), according to certain embodiments.

FIG. 4D is an EDX mapping of L5 depicting calcium (Ca), according to certain embodiments.

FIG. 8A depicts a Nyquist plot for L3 at 383 K with fitting results, according to certain embodiments.

DETAILED DESCRIPTION

Figure 1:
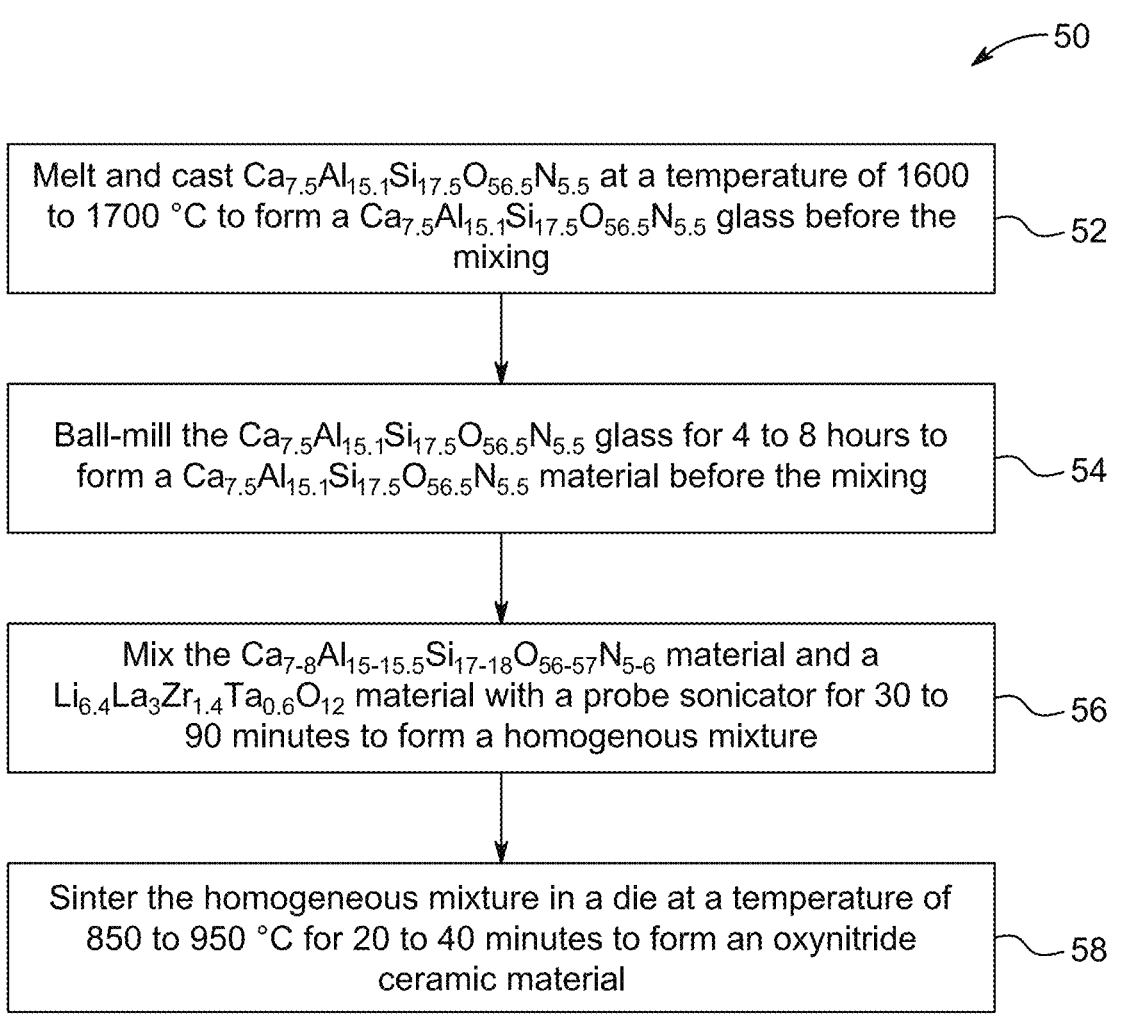
FIG. 1 is an exemplary flowchart of a method of making an oxynitride ceramic material, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like numbered reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "room temperature" refers to a temperature in a range of 25±3 degrees Celsius (° C.).

As used herein, the term "oxynitride ceramic material" refers to a composite inorganic material comprising oxygen and nitrogen within a ceramic lattice, providing enhanced mechanical strength, thermal stability, and ionic conductivity.

As used herein, the term "crystalline" refers to a solid material whose constituents (i.e., atoms, molecules, ions, etc.) are arranged in a highly ordered microscopic structure, forming a crystal lattice that extends in all directions.

As used herein, the term "thermal conductivity" refers to the ability of a material to transfer heat through its structure due to a temperature gradient.

As used herein, the term "thermal expansion" refers to the extent to which a material changes its dimensions in response to variations in temperature.

As used herein, the term "first activation energy" refers to the minimum energy required for a first chemical reaction to occur. For example, a first activation energy may refer to the minimum energy needed to initiate ion transport or conduction associated with a first conduction mechanism, such as lithium-ion movement.

As used herein, the term "second activation energy" refers to the minimum energy required for a second chemical reaction to occur. For example, a second activation energy may refer to the minimum energy needed to activate a secondary conduction process, typically associated with oxygen-ion or mixed ionic transport.

As used herein, the term "void" refers to an unoccupied or empty region within a material's microstructure that can influence density, conductivity, and/or mechanical performance.

As used herein, the term "correlated barrier hopping" refers to a charge transport mechanism in which localized ions or charge carriers move between energetically favorable sites by overcoming (i.e., hopping over) potential barriers influenced by Coulombic interactions within the lattice.

As used herein, the term "sintering" refers to a thermal process that compacts and densifies powdered materials by heating them below their melting point to promote diffusion and bonding between particles a create a more solid, dense object.

As used herein, the term "casting" refers to a fabrication technique in which a material in liquid or semi-liquid form is poured into a mold and solidified to achieve a desired shape or structure.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of this disclosure are directed to calcium-aluminum-silicon-oxynitride-(Ca—Al—Si—O—N—) based glass-ceramic solid-state electrolytes doped with varying concentrations of lithium lanthanum zirconium tantalum oxide (LLZTO, $Li_{6.4}La_3Zr_{1.4}Ta_{0.6}O_{12}$) via spark plasma sintering, exhibiting tunable microstructure, crystallinity, and ionic conductivity suitable for advanced lithium metal-based batteries.

An oxynitride ceramic material is described. The oxynitride ceramic material includes a $Ca_{7-8}Al_{15-15.5}Si_{17-18}O_{56-57}N_{5-6}$ material, preferably a $Ca_{7.1-7.9}Al_{15.02-15.4}Si_{17.1-17.9}O_{56.1-56.9}N_{5.1-5.9}$ material, preferably a $Ca_{7.2-7.8}$

6

$Al_{15.04-15.3}Si_{17.2-17.8}O_{56.2-56.8}N_{5.2-5.8}$ material, preferably a $Ca_{7.3-7.7}Al_{15.06-15.2}Si_{17.3-17.7}O_{56.3-567}N_{5.3-5.7}$ material, more preferably a $Ca_{7.4-7.6}Al_{15.08-15.15}Si_{17.4-17.6}O_{56.4-56.6}N_{5.4-5.6}$ material, and yet more preferably about a $Ca_{7-8}Al_{15.1}Si_{17.5}O_{56.5}N_{5.5}$ material and a $Li_{6.4}La_3Zr_{1.4}Ta_{0.6}O_{12}$ material in an amount of 10 to 80 percent by weight (wt. %), preferably 15 to 75 wt. %, preferably 20 to 70 wt. %, preferably 25 to 65 wt. %, preferably 30 to 60 wt. %, preferably 35 to 55 wt. %, preferably 40 to 50 wt. %, and preferably about 45 wt. % based on a total weight of the oxynitride ceramic material. In some embodiments, the $Ca_{7.5}Al_{15.1}Si_{17.5}O_{56.5}N_{5.5}$ material is a $Ca_{7.5}Al_{15.1}Si_{17.5}O_{56.5}N_{5.5}$ glass material. In one embodiment, the oxynitride ceramic material includes the $Li_{6.4}La_3Zr_{1.4}Ta_{0.6}O_{12}$ material in an amount of about 15 wt. % based on a total weight of the oxynitride ceramic material. In another embodiment, the oxynitride ceramic material includes the $Li_{6.4}La_3Zr_{1.4}Ta_{0.6}O_2$ material in an amount of about 30 wt. % based on a total weight of the oxynitride ceramic material. In another embodiment, the oxynitride ceramic material includes the $Li_{6.4}La_3Zr_{1.4}Ta_{0.6}O_2$ material in an amount of about 45 wt. % based on a total weight of the oxynitride ceramic material. In another embodiment, the oxynitride ceramic material includes the $Li_{6.4}La_3Zr_{1.4}Ta_{0.6}O_2$ material in an amount of about 60 wt. % based on a total weight of the oxynitride ceramic material. In yet another embodiment, the oxynitride ceramic material includes the $Li_{6.4}La_3Zr_{1.4}Ta_{0.6}O_2$ material in an amount of about 75 wt. % based on a total weight of the oxynitride ceramic material. The oxynitride ceramic material is crystalline and includes phases including a lanthanum zirconium oxide ($La_2Zr_2O_7$) phase, a lanthanum tantalum oxynitride ($LaTaON_2$) phase, a lithium aluminate ($LiAlO_2$) phase, a zirconium silicate ($ZrSiO_2$) phase, and a lithium aluminosilicate ($LiAlSi_3O_8$) phase.

In an embodiment, the oxynitride ceramic material includes the $La_2Zr_2O_7$ phase in an amount of at least 20 wt. %, preferably at least 25 wt. %, preferably at least 30 wt. %, preferably at least 35 wt. %, preferably at least 40 wt. %, preferably at least 45 wt. %, and preferably at least 50 wt. % based on a total weight of the phases. In an embodiment, the oxynitride ceramic material includes the $Li_{6.4}La_3Zr_{1.4}Ta_{0.6}O_2$ material in an amount of about 75 wt. % based on a total weight of the oxynitride ceramic material. In a preferred embodiment, the oxynitride ceramic material includes the $Li_{6.4}La_3Zr_{1.4}Ta_{0.6}O_2$ material in an amount of 75 wt. % based on a total weight of the oxynitride ceramic material.

In some embodiments, the oxynitride ceramic material has a density of 2.7 to 4 g/cm$^3$, preferably 2.8 to 3.9 g/cm$^3$, preferably 2.9 to 3.8 g/cm$^3$, preferably 3 to 3.7 g/cm$^3$, preferably 3.1 to 3.6 g/cm$^3$, preferably 3.2 to 3.5 g/cm$^3$, and preferably 3.3 to 3.4 g/cm$^3$. In some embodiments, the oxynitride ceramic material has a density of 3.8 to 4 g/cm$^3$, preferably 3.82 to 3.99 g/cm$^3$, preferably 3.84 to 3.98 g/cm$^3$, preferably 3.86 to 3.97 g/cm$^3$, preferably 3.88 to 3.96 g/cm$^3$, preferably 3.89 to 3.95 g/cm$^3$, preferably 3.9 to 3.94 g/cm$^3$, more preferably 3.91 to 3.93 g/cm$^3$, and yet more preferably about 3.92 g/cm$^3$. In a preferred embodiment, the oxynitride ceramic material has a density of 3.92 g/cm$^3$.

In some embodiments, the oxynitride ceramic material has a thermal conductivity of 1.5 to 1.8 W/m·K, preferably 1.52 to 1.78 W/m·K, preferably 1.54 to 1.76 W/m·K, preferably 1.56 to 1.74 W/m·K, preferably 1.58 to 1.72 W/m·K, preferably 1.6 to 1.7 W/m·K, preferably 1.62 to 1.68 W/m·K, and preferably 1.64 to 1.66 W/m·K. In some embodiments, the oxynitride ceramic material has a thermal conductivity of 1.5 to 1.7 W/m·K, preferably 1.52 to 1.68 W/m·K, preferably 1.54 to 1.66 W/m·K, preferably 1.56 to 1.64 W/m·K, more preferably 1.58 to 1.62 W/m·K, and yet more preferably 1.6 to 1.61 W/m·K. In a preferred embodiment, the oxynitride ceramic material has a thermal conductivity of 1.61 W/m·K.

In some embodiments, the oxynitride ceramic material has a thermal expansion of 4.7 to 5.6 ppm/° C., preferably 4.8 to 5.5 ppm/° C., preferably 4.9 to 5.4 ppm/° C., preferably 5 to 5.3 ppm/° C., and preferably 5.1 to 5.2 ppm/° C. In some embodiments, the oxynitride ceramic material has a thermal expansion of 4.8 to 5 ppm/° C., preferably 4.81 to 4.99 ppm/° C., preferably 4.82 to 4.98 ppm/° C., preferably 4.83 to 4.97 ppm/° C., preferably 4.84 to 4.96 ppm/° C., preferably 4.85 to 4.95 ppm/° C., preferably 4.86 to 4.94 ppm/° C., preferably 4.87 to 4.93 ppm/° C., preferably 4.88 to 4.92 ppm/° C., more preferably 4.89 to 4.91 ppm/° C., and yet more preferably about 4.9 ppm/° C. In a preferred embodiment, the oxynitride ceramic material has a thermal expansion of 4.9 ppm/° C.

In some embodiments, the oxynitride ceramic material has a first activation energy of 0.7 to 1 eV, preferably 0.71 to 0.99 eV, preferably 0.73 to 0.97 eV, preferably 0.75 to 0.95 eV, preferably 0.77 to 0.93 eV, preferably 0.79 to 0.91 eV, preferably 0.81 to 0.89 eV, and preferably 0.83 to 0.87 eV. In some embodiments, the oxynitride ceramic material has a first activation energy of 0.85 to 0.95 eV, preferably 0.86 to 0.94 eV, preferably 0.87 to 0.93 eV, preferably 0.88 to 0.92 eV, and preferably 0.89 to 0.91 eV.

In some embodiments, the oxynitride ceramic material has a second activation energy ranging from 0.8 to 1.1 eV, preferably 0.81 to 1.09 eV, preferably 0.83 to 1.07 eV, preferably 0.85 to 1.05 eV, preferably 0.87 to 1.03 eV, preferably 0.89 to 1.01 eV, preferably 0.91 to 0.99 eV, and preferably 0.93 to 0.97 eV. In some embodiments, the oxynitride ceramic material has a second activation energy of 0.97 to 1.07 eV, preferably 0.98 to 1.06 eV, preferably 0.99 to 1.05 eV, preferably 1 to 1.04 eV, and preferably 1.01 to 1.03 eV.

In some embodiments, the oxynitride ceramic material includes nodules having a diameter of 0.1 to 5 μm, preferably 0.3 to 4.9 μm, preferably 0.5 to 4.7 μm, preferably 0.7 to 4.5 μm, preferably 0.9 to 4.3 μm, preferably 1.1 to 4.1 μm, preferably 1.3 to 3.9 μm, preferably 1.5 to 3.7 μm, preferably 1.7 to 3.5 μm, preferably 1.9 to 3.3 μm, preferably 2.1 to 3.1 μm, preferably 2.3 to 2.9 μm, and preferably 2.5 to 2.7 μm and voids having a length of 5 to 50 μm, preferably 10 to 45 μm, preferably 15 to 40 μm, preferably 20 to 35 μm, and preferably 25 to 30 μm.

In some embodiments, ions are transported within the oxynitride ceramic material via small polaron hopping, quantum mechanical tunneling, variable range hopping, nearest-neighbor hopping, vacancy diffusion, interstitial diffusion, grain boundary diffusion, space charge polarization, trap-controlled hopping, phonon-assisted hopping, correlated barrier hopping, defect-mediated conduction, mixed ionic-electronic conduction, potential barrier modulation, localized state transition, thermally activated hopping mechanisms, a combination thereof, and the like. In a preferred embodiment, ions are transported within the oxynitride ceramic material via correlated barrier hopping. In oxynitride ceramic materials, ion transport can occur through a correlated barrier hopping (CBH) mechanism, which describes the movement of localized charge carriers between energetically favorable sites separated by potential barriers. Due to the partially disordered structure of oxynitride ceramics, containing both oxygen and nitrogen anions, the ions are confined to localized states rather than moving freely as in metallic conductors. Under the influence of thermal energy or an external electric field, these ions hop from one localized site to another by overcoming an energy barrier. The term "correlated" signifies that the hopping process is influenced by the Coulombic interaction between the charge carriers and their surrounding lattice, meaning that the potential barrier height depends on spatial correlation between the initial and final hopping sites. This mechanism can explain the frequency-dependent conductivity behavior often observed in such materials, where the AC conductivity follows a power law and the exponent decreases with increasing temperature. Overall, the CBH model effectively captures the thermally activated, field-assisted hopping of ions in disordered lattices of oxynitride ceramics, accounting for their characteristic electrical conduction behavior.

FIG. 1 illustrates a schematic flow chart of a method 50 of forming an oxynitride ceramic material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes melting and casting $Ca_{7.5} Al_{15.1} Si_{17.5}O_{56.5}N_{5.5}$ at a temperature of 1600 to 1700° C., preferably 1610 to 1690° C., preferably 1620 to 1680° C., preferably 1630 to 1670° C., more preferably 1640 to 1660° C., and yet more preferably about 1650° C. to form a $Ca_{7.5} Al_{15.1} Si_{17.5}O_{56.5}N_{5.5}$ glass. In some embodiments, the method 50 includes melting and casting $Ca_{7.5}Al_{15.1} Si_{17.5}O_{56.5}N_{5.5}$ at a temperature of 1650° C. to form a $Ca_{7.5}Al_{15.1}Si_{17.5}O_{56.5}N_{5.5}$ glass before mixing.

At step 54, the method 50 includes ball-milling the $Ca_{7.5} Al_{15.1}Si_{17-8}O_{56.5}N_{5.5}$ glass for 4 to 8 hours, preferably 4.5 to 7.5 hours, preferably 5 to 7 hours, more preferably 5.5 to 6.5 hours, and yet more preferably about 6 hours to form a $Ca_{7.5} Al_{15.1}Si_{17.5}O_{56.5}N_{5.5}$ material. In some embodiments, the $Ca_{7.5}Al_{15.4}Si_{17.5}O_{56.5}N_{5.5}$ material is a powder. In some embodiments, the method 50 includes ball-milling the $Ca_{7.5} Al_{15.1}Si_{17-8}O_{56.5}N_{5.5}$ glass for 6 hours to form the $Ca_{7.5} Al_{15.1}Si_{17-8}O_{56.5}N_{5.5}$ material.

At step 56, the method 50 includes mixing the $Ca_{7-8} Al_{15-15.5}Si_{17-18}O_{56-57}N_{5-6}$ material and the $Li_{6.4}La_3Zr_{1.4}Ta_{0.6}O_{12}$ material with a probe sonicator for 30 to 90 minutes, preferably 35 to 85 minutes, preferably 40 to 80 minutes, preferably 45 to 75 minutes, preferably 50 to 70 minutes, more preferably 55 to 65 minutes, and yet more preferably about 60 minutes to form a homogenous mixture. In a preferred embodiment, the method 50 includes mixing the $Ca_{7.5}$ $Al_{15.1}Si_{17-8}O_{56.5}N_{5.5}$ material and the $Li_{6.4}La_3Zr_{1.4}Ta_{0.6}O_{12}$ material with a probe sonicator for 60 minutes to form a homogenous mixture. In some embodiments, the homogeneous mixture is a well-dispersed fine powder mixture.

In some embodiments, mixing may include, but is not limited to, mixing with a magnetic stirrer, a mechanical stirrer, an overhead stirrer, a vortex mixer, a planetary mixer, a ball mill, a high-energy ball mill, a roller mill, an attrition mill, a jet mill, a mortar and pestle, a blender, a homogenizer, an ultrasonicator, an ultrasonic bath, a high-shear mixer, an impeller mixer, a disperser, an agitator, a shaker, a bead mill, a rotor-stator mixer, a ribbon blender, a twin-screw mixer, a paddle mixer, a centrifugal mixer, a kneader, a colloid mill, a planetary centrifugal mixer, a vortex shaker, a high-speed disperser, a mechanochemical mixer, a combination thereof, and the like. In a preferred embodiment, mixing the $Ca_{7-8}Al_{15-15.5}Si_{17-18}O_{56-57}N_{5-6}$ material and the $Li_{6.4}La_3Zr_{1.4}Ta_{0.6}O_{12}$ material occurs with a probe sonicator.

At step 58, the method 50 includes sintering the homogeneous mixture in a die at a temperature of 850 to 950° C., preferably 860 to 940° C., preferably 870 to 930° C., preferably 880 to 920° C., more preferably 890 to 910° C., and yet more preferably about 900° C. for 20 to 40 minutes, preferably 22 to 38 minutes, preferably 24 to 36 minutes, preferably 26 to 34 minutes, more preferably 28 to 32 minutes, and yet more preferably about 30 minutes to form the oxynitride ceramic material. In a preferred embodiment, sintering the homogeneous mixture in a die occurs at a temperature of 900° C. for 30 minutes to form the oxynitride ceramic material.

In some embodiments, the sintering may include, but is not limited to, conventional sintering, pressure less sintering, hot pressing, hot isostatic pressing, microwave sintering, two-step sintering, liquid phase sintering, solid state sintering, reactive sintering, flash sintering, field-assisted sintering, plasma sintering, spark plasma sintering, induction sintering, laser sintering, electric field sintering, cold sintering, rapid sintering, selective laser sintering, atmosphere-controlled sintering, vacuum sintering, inert gas sintering, oxidative sintering, reduction sintering, transient liquid phase sintering, low-temperature sintering, ultrafast sintering, gradient sintering, pressure-assisted sintering, hybrid sintering, microwave-assisted sintering, isothermal sintering, a combination thereof, and the like. In a preferred embodiment, the sintering is spark plasma sintering. In some embodiments, the oxynitride ceramic material is crystalline and includes phases including a $La_2Zr_2O_7$ phase, a $LaTaON_2$ phase, a $LiAlO_2$ phase, a $ZrSiO_2$ phase, and a $LiAlSi_3O_8$ phase after the spark plasma sintering.

In some embodiments, a heating rate during the sintering is 80 to 120° C./min, preferably 85 to 115° C./min, preferably 90 to 110° C./min, more preferably 95 to 105° C./min, and yet more preferably about 100° C./min. In a preferred embodiment, a heating rate during the sintering is 100° C./min.

In some embodiments, the die is pressurized to 25 to 35 MPa, preferably 26 to 34 MPa, preferably 27 to 33 MPa, preferably 28 to 32 MPa, more preferably 29 to 31 MPa, and yet more preferably about 30 MPa. In a preferred embodiment, the die is pressurized to 30 MPa.

In some embodiments, the die is placed in a vacuum having a pressure of $4 \times 10^{-2}$ to $5 \times 10^{-2}$ mbar, preferably $4.1 \times 10^{-2}$ to $4.9 \times 10^{-2}$ mbar, preferably $4.2 \times 10^{-2}$ to $4.8 \times 10^{-2}$ mbar, preferably $4.3 \times 10^{-2}$ to $4.7 \times 10^{-2}$ mbar, more preferably $4.4 \times 10^{-2}$ to $4.6 \times 10^{-2}$ mbar, and yet more preferably about $4.5 \times 10^{-2}$ mbar during the sintering. In a preferred embodiment, the die is placed in a vacuum having a pressure of $4.5 \times 10^{-2}$ mbar during the sintering.

The following examples are provided solely for illustration and are not to be construed as limitations of the present disclosure, as many variations thereof are possible without departing from the spirit and scope of the present disclosure.

EXAMPLES

The following examples describe and demonstrate an oxynitride ceramic material. The examples are provided solely for illustration and are not to be construed as limitations of the present disclosure, as many variations thereof are possible without departing from the spirit and scope of the present disclosure.

Example 1: Experimental

The oxynitride glass composition of $Ca_{7.5}Al_{15.1}Si_{17.5}O_{56.5}N_{5.5}$ was synthesized at 1650° C. using a radio frequency furnace. $Ca_{7.5}Al_{15.1}Si_{17.5}O_{56.5}N_{5.5}$ glass was crushed and ball milled for 6 hours. The powder was mixed with different proportions of LLZTO ($Li_{6.4}La_3Zr_{1.4}Ta_{0.6}O_{12}$) powder (99%, Sigma-Aldrich), i.e., 15, 30, 45, 60, and 75 wt. % LLZTO dopants. Table 1 shows the composition of the samples. The samples were placed in separate bottles and left for 1 h on a probe sonication machine to guarantee uniform distribution of LLZTO particles in the glass matrix.

TABLE 1

Sample IDs and composition and weights of ingredients used, as well as density, thermal conductivity, and thermal expansion values.

| IDs | LLZTO content (wt. %) | Weight of LLZTO (g) | Weight of parent glass (g) | Total weight (g) | Density (g/cm³) | Thermal conductivity (W/ m · K) | Thermal expansion (ppm/ ° C.) |
|---|---|---|---|---|---|---|---|
| L0 | 0 | 0 | 6.0 | 6.00 | 2.45 | 1.39 | 4.3 |
| L1 | 15 | 0.9 | 5.1 | 6.00 | 2.8 | 1.69 | 5.3 |
| L2 | 30 | 1.8 | 4.2 | 6.00 | 2.9 | 1.67 | 5.4 |
| L3 | 45 | 2.7 | 3.3 | 6.00 | 3.16 | 1.66 | 5.3 |
| L4 | 60 | 3.6 | 2.4 | 6.00 | 3.42 | 1.62 | 4.9 |
| L5 | 75 | 4.5 | 1.5 | 6.00 | 3.92 | 1.61 | 4.9 |

Once the homogenized mixture was prepared, each sample was individually sintered in a spark plasma sintering (SPS) machine (UP D5, FCT Systems, Germany) to achieve the transformation of the amorphous material into a glass-ceramic pellet. Synthesis was done while placing the mixed powder between two cylindrical punches inside a graphite die. A graphite sheet layer was used to cap the powder inside the die to prevent leakages and ease the removal of the synthesized sample(s) from the die. The uniaxial pressure and temperature of the synthesis were carefully controlled before the process. The uniaxial pressure exerted during synthesis depends on the die diameter used. For example, a 20 mm die uses a uniaxial pressure of 30 MPa. The synthesis was carried out in a vacuum of $4.5 \times 10^{-2}$ mbar with a soaking time of 30 min at 900° C., which is just below the transition temperature of the $Ca_{7.5}Al_{15.1}Si_{17.5}O_{56.5}N_{5.5}$ oxynitride glass (940° C.). Maintaining the composition at this temperature facilitates the partial crystallization of the glass, resulting in a glass-ceramic nature in the presence of crystalline LLTZO, which helps in the formation of crystallization. The glass transition temperature was determined using a differential thermal analysis (DTA) curve. The heating rate for the SPS process was 100° C./min. The synthesis process has three stages: grain rearrangement, diffusion, and precipitant coalescence. The object's compactness is achieved during diffusion. Once the synthesis process is completed, some graphite can attach to the surface of the glass ceramic as an impurity. The sample surface was cleaned by placing it on a rotating disk of SiC abrasive paper; furthermore, rotating sheets with an alumina suspension were used to flatten and polish the surface. The XRD instrument used for the analysis was a Panalytical X'pert PRO MPD diffractometer using Cu $K_\alpha$ (1.5401 Å) source, operated at 45 kV and 40 mA. A scanning electron microscope (SEM) (JSM-7000F, JEOL, Japan with Schottky-type FEG) using an energy-dispersive X-ray spectrometer (EDS detector, Oxford Instruments, UK) was used. Fourier-transform infrared (FTIR) spectra were obtained using a PerkinElmer MIR/FIR spectrometer with a TGS detector using KBr pellets. The spectra were collected in the range of 4000-400 cm$^{-1}$, with an average of 32 scans. Densities were calculated using Archimedes' principle ($\rho_{(H2O)}$=0.998 g/cm$^3$) at 25° C. The densities were determined with the help of a Mettler Toledo density measurement kit. Thermal conductivity analysis was performed using the modified transient plane source (MTPS) method using a C-Therm (TCi, Canada) instrument at 25° C. Thermal expansion coefficients were calculated using thermal expansion equipment (TMA/SDTA 1 LF/1100, Mettler Toledo). Impedance analysis was performed using impedance spectroscopy with a Novocontrol Concept 40 Alpha-A broadband dielectric spectrometer, equipped with a ZG4 dielectric interface. Measurements were conducted in a nitrogen atmosphere, with temperature control provided by a Quatro Cryosystem. Before measurements, the samples were polished with sandpaper to ensure a smooth surface, after which gold electrodes were deposited via vapor deposition. An alternating voltage of 1 V$_{rms}$ was applied, and data were collected over a frequency range of 10 mHz to 1 MHz. The temperature was adjusted systematically in 10 K increments during both heating and cooling, spanning a range from 153 to 473 K.

Example 2: Microstructure and Morphology

Figure 2A:
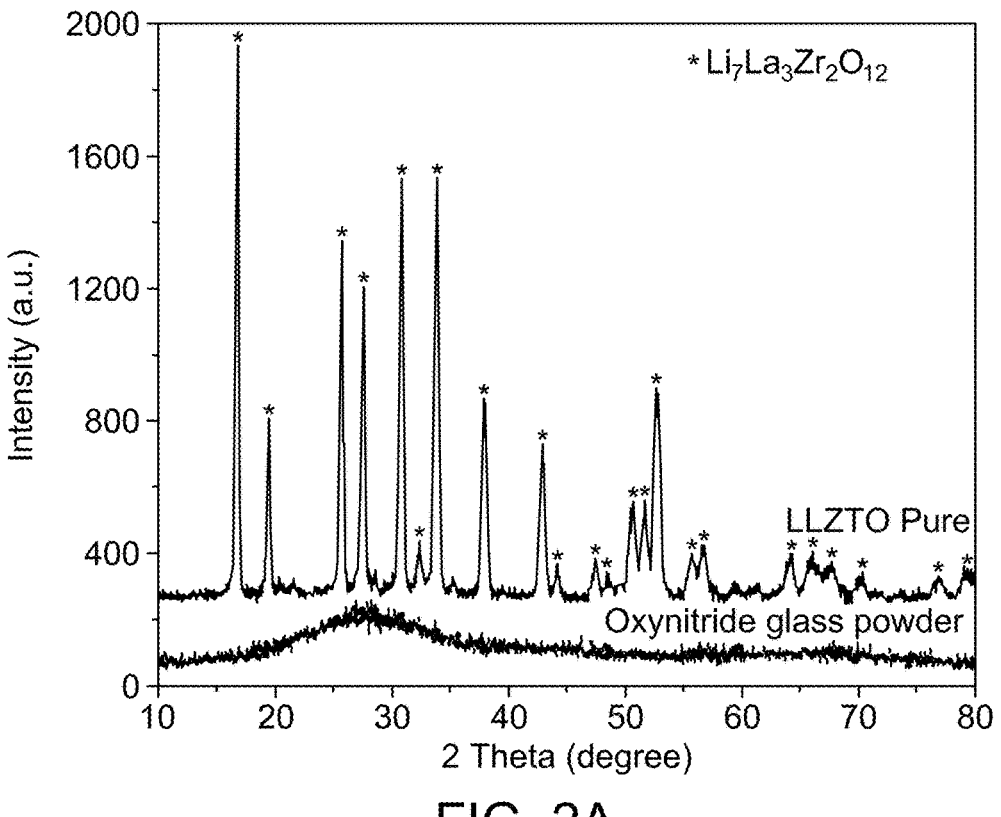
FIG. 2A depicts an X-ray diffraction (XRD) pattern of an oxynitride glass powder and lithium lanthanum zirconium tantalum oxide (LLZTO), according to certain embodiments.
Figure 2B:
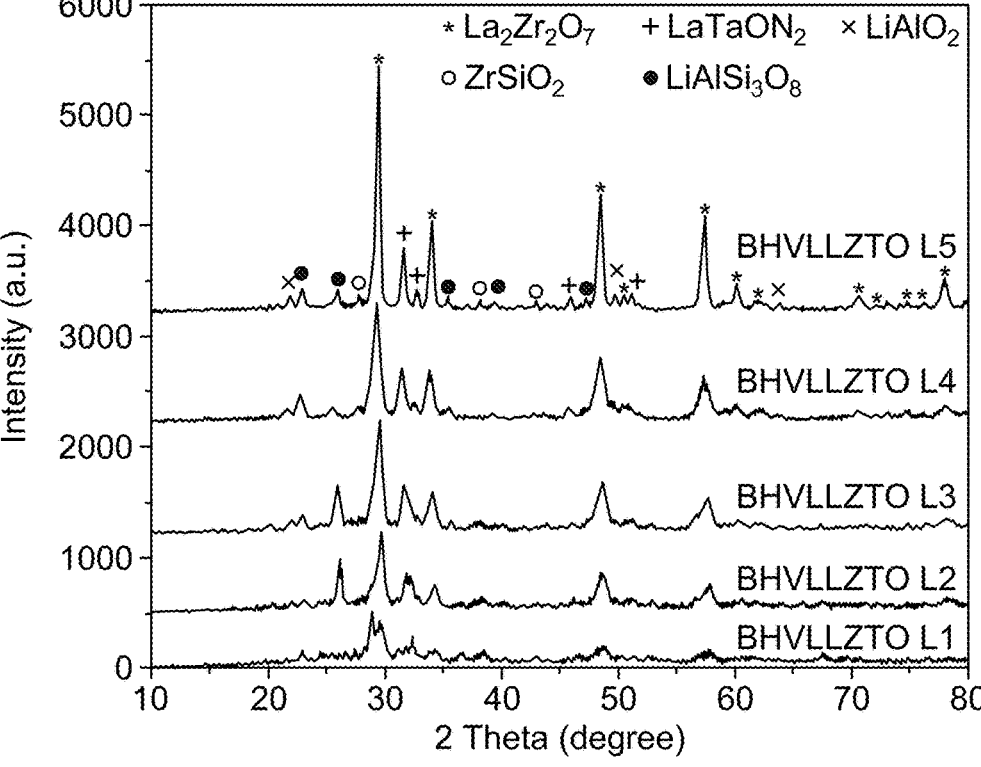
FIG. 2B depicts XRD patterns of LLZTO-doped samples, according to certain embodiments.
Figure 3A:
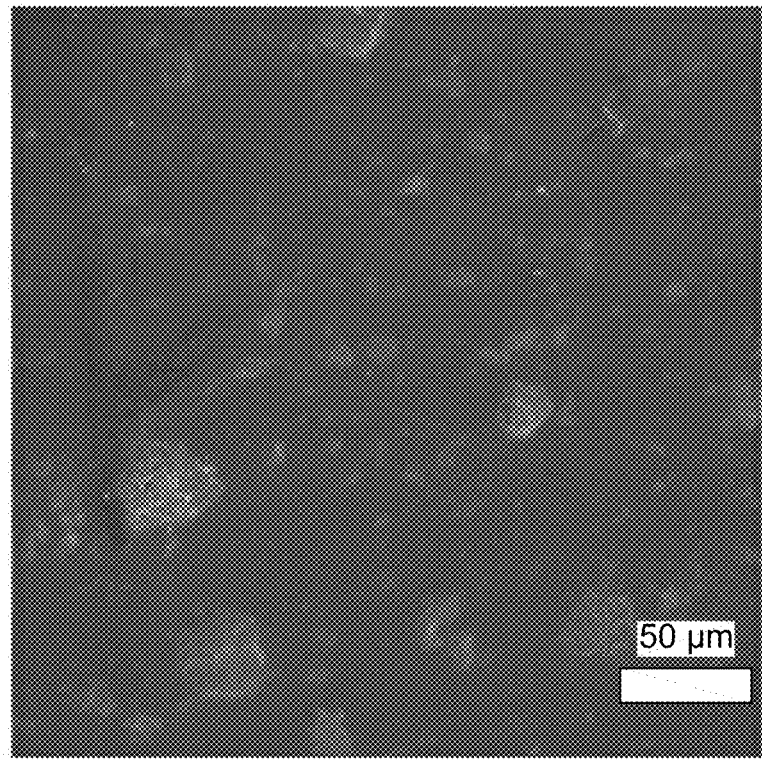
FIG. 3A depicts a scanning electron microscopy (SEM) analysis of a glass-ceramic, L0, with a scale of 50 μm, according to certain embodiments.
Figure 3B:
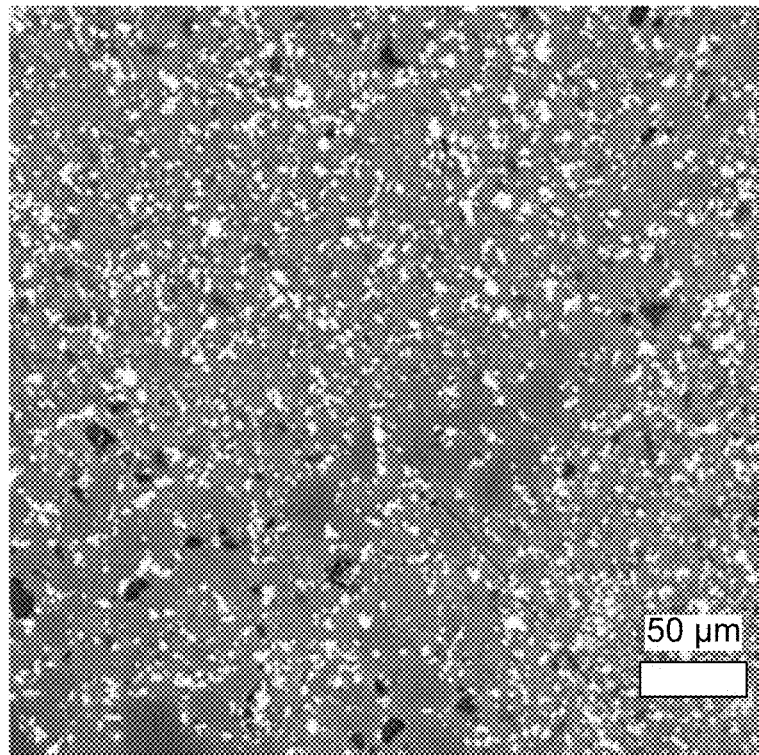
FIG. 3B depicts an SEM analysis of a glass-ceramic, L1, with a scale of 50 μm, according to certain embodiments.
Figure 3C:
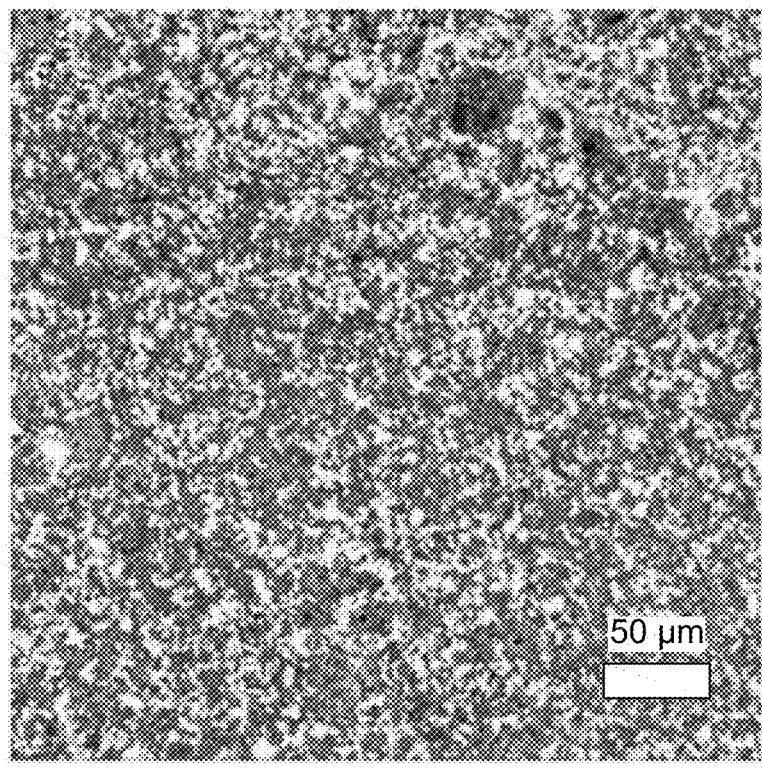
FIG. 3C depicts an SEM analysis of a glass-ceramic, L2, with a scale of 50 μm, according to certain embodiments.
Figure 3D:
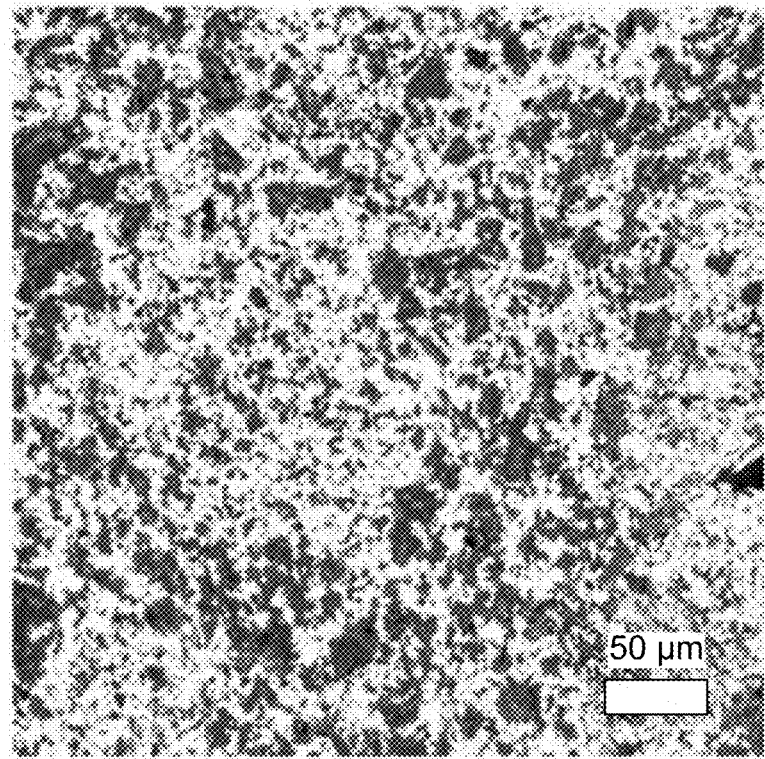
FIG. 3D depicts an SEM analysis of a glass-ceramic, L3, with a scale of 50 μm, according to certain embodiments.
Figure 3E:
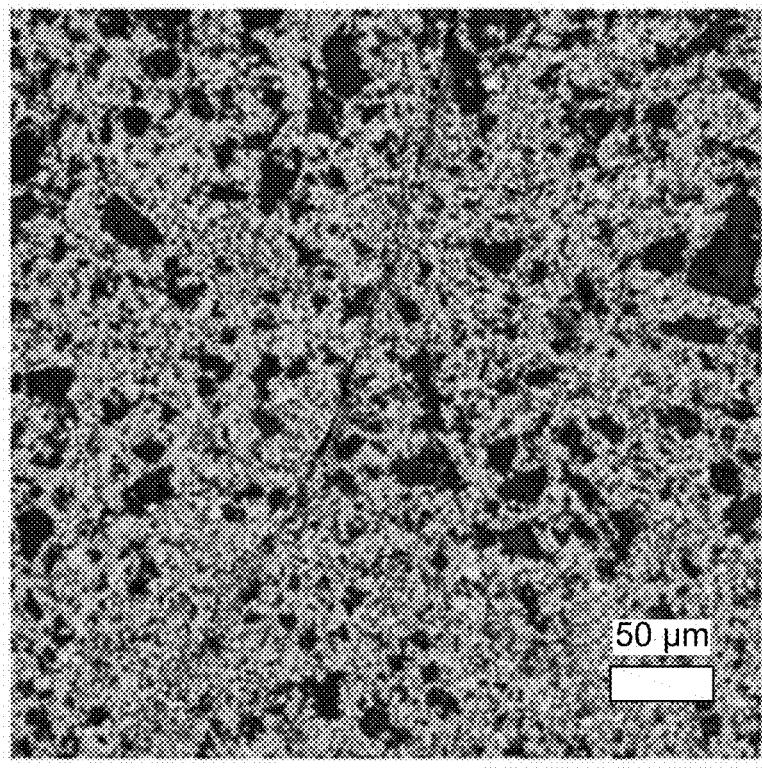
FIG. 3E depicts an SEM analysis of a glass-ceramic, L4, with a scale of 50 μm, according to certain embodiments.
Figure 3F:
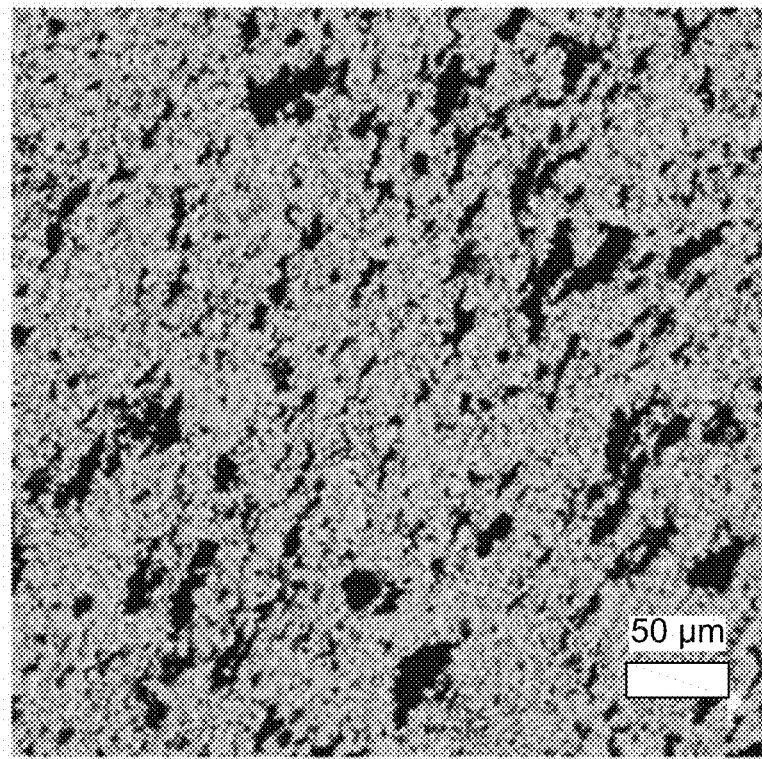
FIG. 3F depicts an SEM analysis of a glass-ceramic, L5, with a scale of 50 μm, according to certain embodiments.
Figures 4E, 4F, 4G:
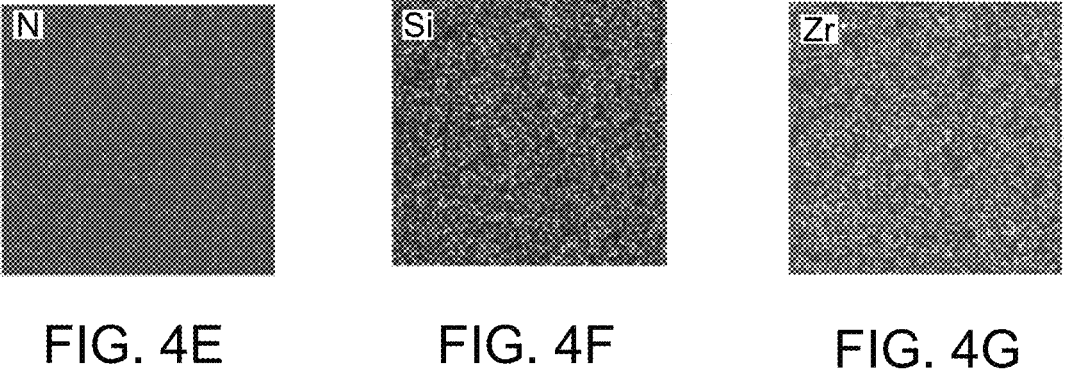
FIG. 4E is an EDX mapping of L5 depicting nitrogen (N), according to certain embodiments.
FIG. 4F is an EDX mapping of L5 depicting silicon (Si), according to certain embodiments.
FIG. 4G is an EDX mapping of L5 depicting zirconium (Zr), according to certain embodiments.
Figures 4H, 4I:
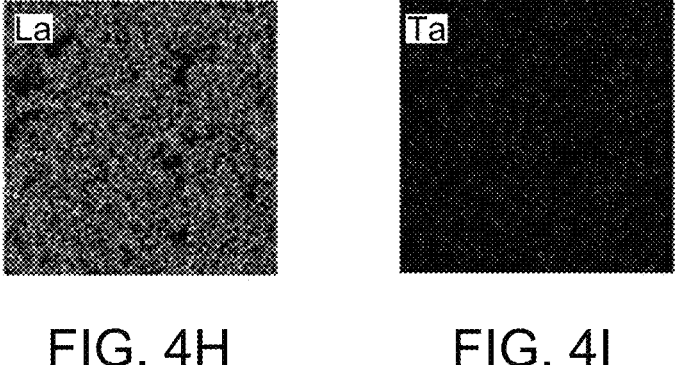
FIG. 4H is an EDX mapping of L5 depicting lanthanum (La), according to certain embodiments.
FIG. 4I is an EDX mapping of L5 depicting tantalum (Ta), according to certain embodiments.

X-ray analysis of Ca$_{7.5}$ Al$_{15.1}$ Si$_{17.5}$O$_{56.5}$N$_{5.5}$ was conducted and shown in FIG. 2A, displaying an amorphous nature and LLZTO. This shallow, amorphous profile is typical and is associated with glasses. The color of the SPS sample of the pure glass was brown. FIG. 2B shows the diffraction patterns of the glass sample once doped with varying amounts of LLZTO, labeled as L1 to L5. Similar crystalline phases were observed, despite variations in the dopant concentration. Symbols of the various matched phases are displayed in FIG. 2B. The matched phases found in glass-ceramics were lanthanum zirconium oxide (La$_2$Zr$_2$O$_7$) as the dominant phase, which was followed by lanthanum tantalum oxynitride (LaTaON$_2$) and smaller amounts of lithium aluminate (LiAlO$_2$), zirconium silicate (ZrSiO$_2$), and lithium aluminosilicate (LiAlSi$_3$O$_8$).

The presence of the La$_2$Zr$_2$O$_7$ phase can arise during the synthesis process, where lithium loss may occur; however, this phase can help maintain structural stability in solid-state electrolytes. Conversely, lithium aluminum oxide (LiAlO$_2$) exhibits properties that inhibit lithium dendrite growth. Introducing it between lithium metal and oxide-based electrolytes reduces lithium dendrite formation and stabilizes the interface. The presence of these buffers acts like a bridge, further preventing unwanted reactions and increasing the overall cycle life of the battery. Zirconium-based materials are commonly used in solid-state electrolytes. Zirconia (ZrO$_2$) is often incorporated into solid-state electrolytes to enhance lithium-ion transport and improve cycling stability. The intensities and breadth change with the lithium and lanthanum content in the glass-ceramic material. For sample L1, which contains the lowest LLZTO content, only broad, low-intensity reflections are observed, indicating a low concentration of the crystalline phase, likely composed of small crystallites. As the LLZTO content increases, a corresponding rise in both the crystalline phase content and crystallite size is observed for sample L2. The CaAlSiON glass, initially serving as the matrix for the L1-L3 samples, begins to function more as an admixture in the L4-L5 samples, as its content becomes lower than that of LLZTO. While the crystallinity in the L3 and L4 samples remains relatively similar, an increase in reflection intensity is observed only for the L5 sample, indicating an enhancement in crystallization. During the synthesis process, reactions can occur between adjacent oxide materials, leading to the emergence of lithium lanthanum-rich crystalline phases as the LLZTO reacts with the surrounding amorphous glass. To better understand this process and the absence of a crystalline phase associated with LLZTO, thermal stability of the dopant itself is analyzed. LLZTO remains stable over a wide temperature range but begins to decompose and degrade under specific conditions. It remains thermally stable up to approximately 1000-1100° C., with decomposition beginning above 1100-1200° C., resulting in the formation of secondary phases such as Li$_2$O, La$_2$O$_3$, and ZrO$_2$. An issue that occurs at temperatures above 700-800° C. and affects the structural integrity and electrical properties of LLZTO is lithium loss. Additionally, in a CO$_2$-rich atmosphere, LLZTO can react with carbon dioxide to form lithium carbonate in the temperature range of 600-800° C., which can further degrade performance. Although the synthesis process of the tested glass-ceramics was conducted at 900° C. for 30 minutes in a vacuum, i.e., below the LLZTO degradation temperature, the temperature was sufficiently high to initiate lithium volatilization. Pressure applied during spark plasma sintering also determines properties of the samples. The relationship between synthesis temperature with pressure (T$_P$) and without pressure (T$_0$) can be approximated by: T$_0$=T$_P$+ΔT, where ΔT represents the temperature increase used to achieve comparable densification in pressure less synthesis. Empirical studies on hot pressing (HP) or pressure-assisted sintering indicate that applying a pressure of 30 MPa reduces the synthesis temperature by approximately 200-300° C. compared to conventional synthesis. Given that the ceramic was synthesized at 900° C. under 30 MPa, the corresponding synthesis temperature without applied pressure would be in the range of: T$_0$≈1100-1200° C. The exact temperature depends on the material composition, mass transport mechanisms, and other processing conditions such as the synthesis atmosphere. Ultimately, the synthesis temperature reached the degradation threshold of LLZTO, leading to its decomposition and subsequent reactions between the degradation products (Li$_2$O, La$_2$O$_3$, ZrO$_2$) and the silicate-aluminate glass. As a result, the observed crystalline phases are not only related to LLZTO itself but also include reaction products such as lithium aluminate (LiAlO$_2$), zirconium silicate (ZrSiO$_4$), and lithium aluminosilicate (LiAlSi$_3$O$_8$), confirming interactions between LLZTO and the surrounding glass phase.

Microstructures of the samples were also observed using SEM, and the resulting images are presented in FIGS. 3A-3F in the order of L0 to L5. The SEM investigation indicates that crystallinity is governed by the amount of LLZTO doped into the glass matrix. Undoped glass, referred to as L0, possesses a homogeneous and featureless microstructure, without any phase separation or defects, characteristic of a material with an amorphous nature; however, when L1 to L5 were analyzed, clear crystalline microstructures related to lithium and lanthanum compounds were observed. FIGS. 4A-4I show corresponding energy dispersive X-ray mapping of the L5 sample. The analysis confirms the homogeneity of the structural mixture, where no segregation or precipitation is observed.

Figure 5:
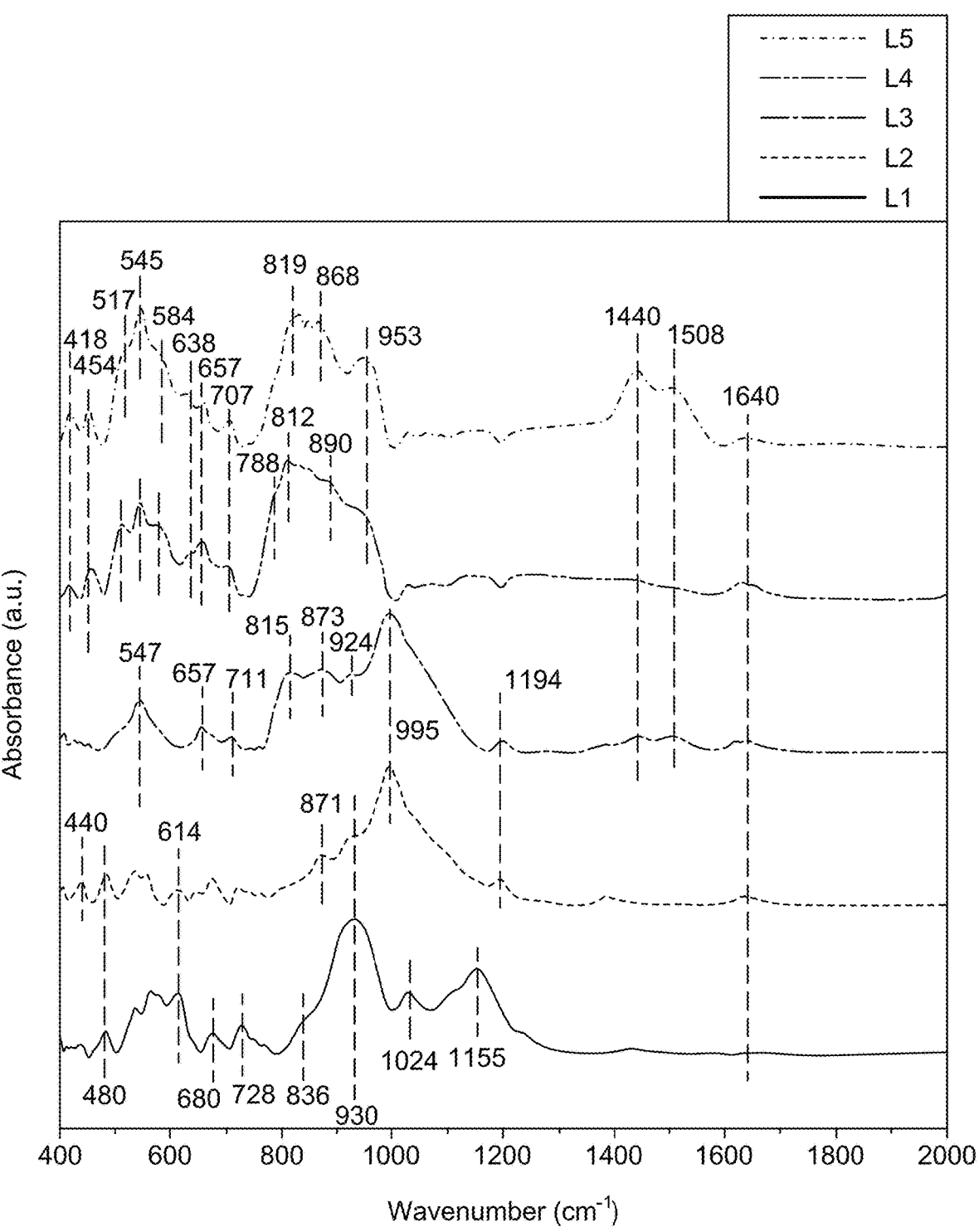
FIG. 5 depicts infrared (IR) spectra of L1-L5, according to certain embodiments.
Figure 6A:
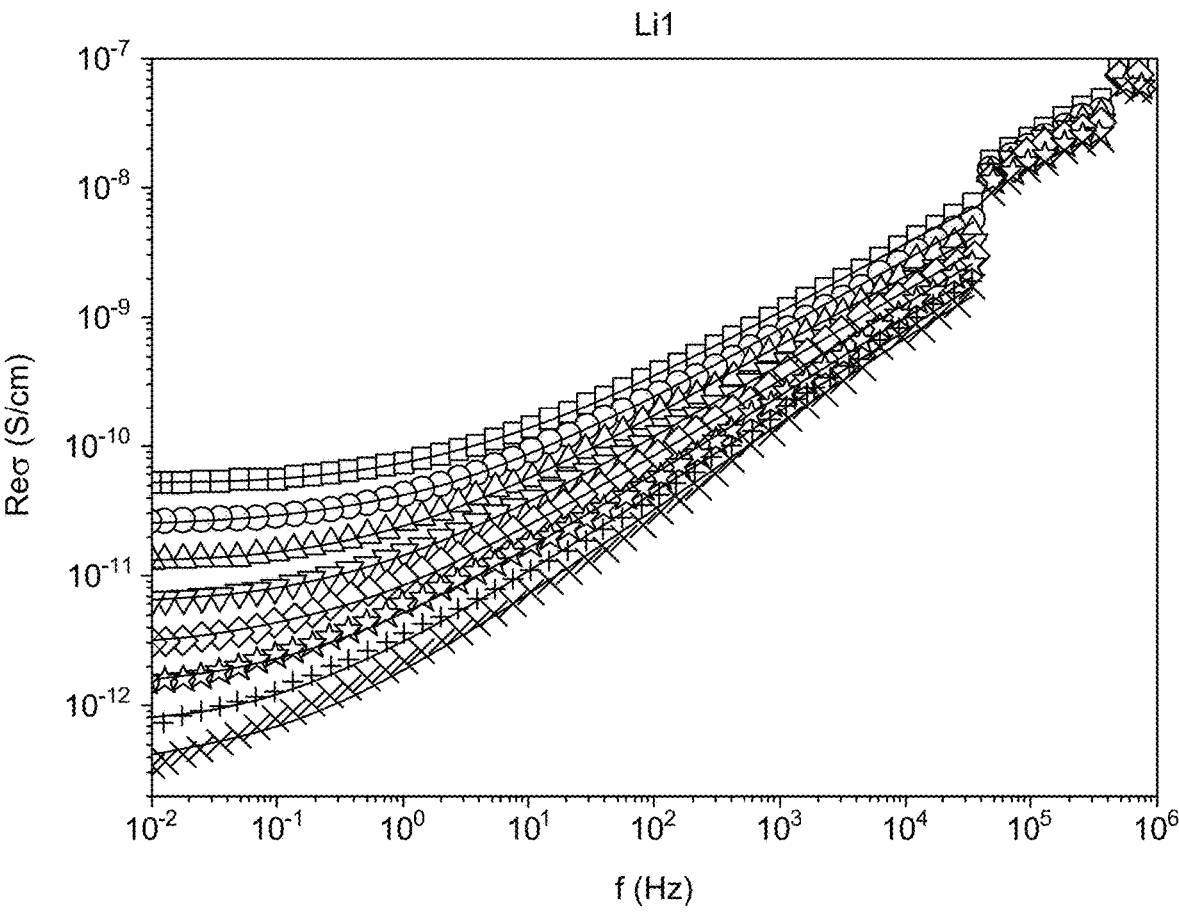
FIG. 6A depicts an alternating current (AC) conductivity spectrum for L1 with Jonscher's relation fit, according to certain embodiments.
Figure 6B:
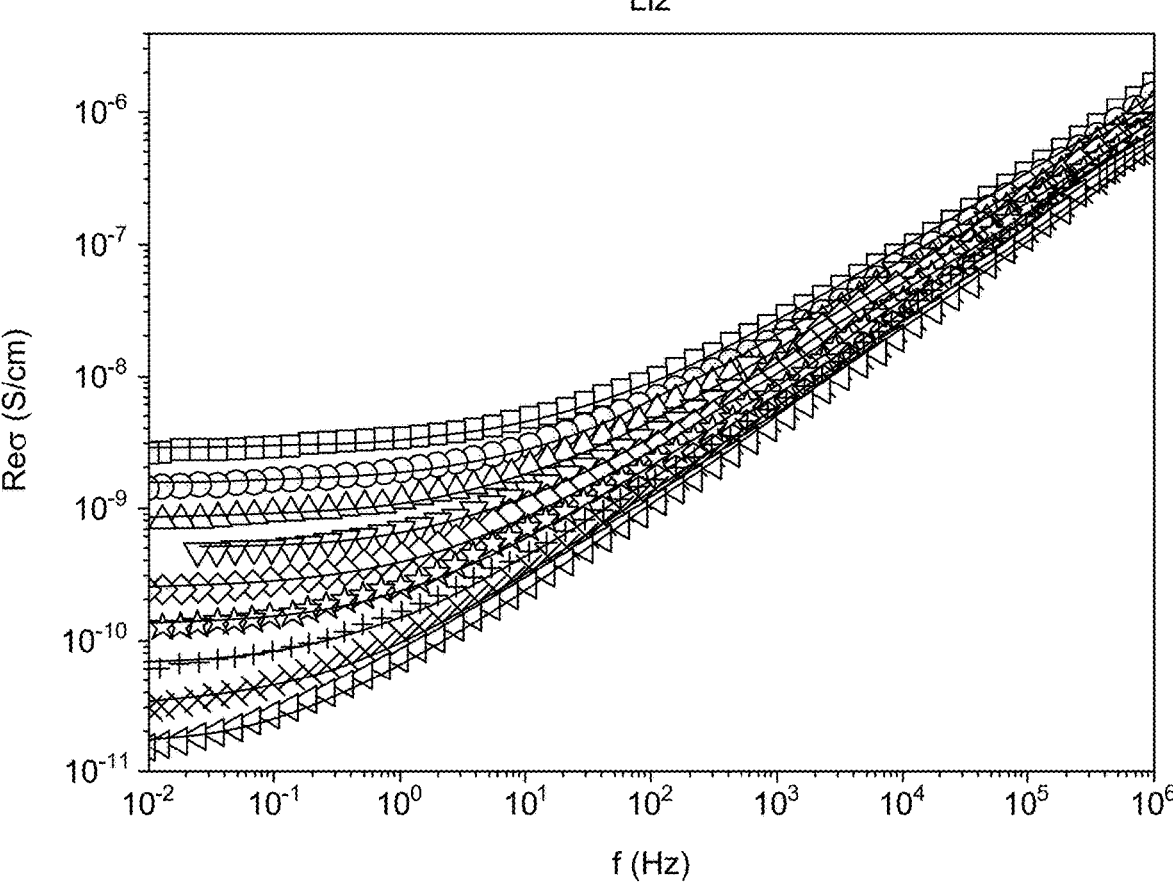
FIG. 6B depicts an AC conductivity spectrum for L2 with Jonscher's relation fit, according to certain embodiments.
Figure 6C:
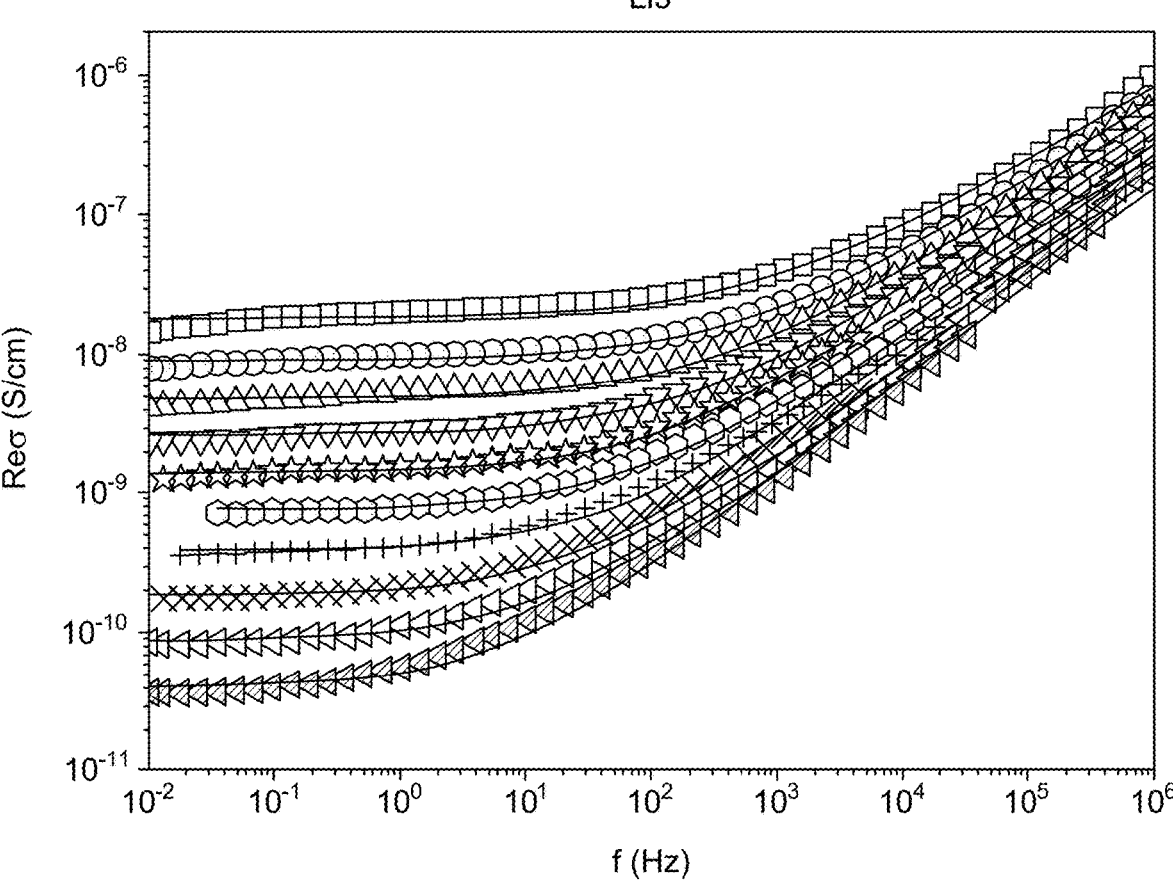
FIG. 6C depicts an AC conductivity spectrum for L3 with Jonscher's relation fit, according to certain embodiments.
Figure 6D:
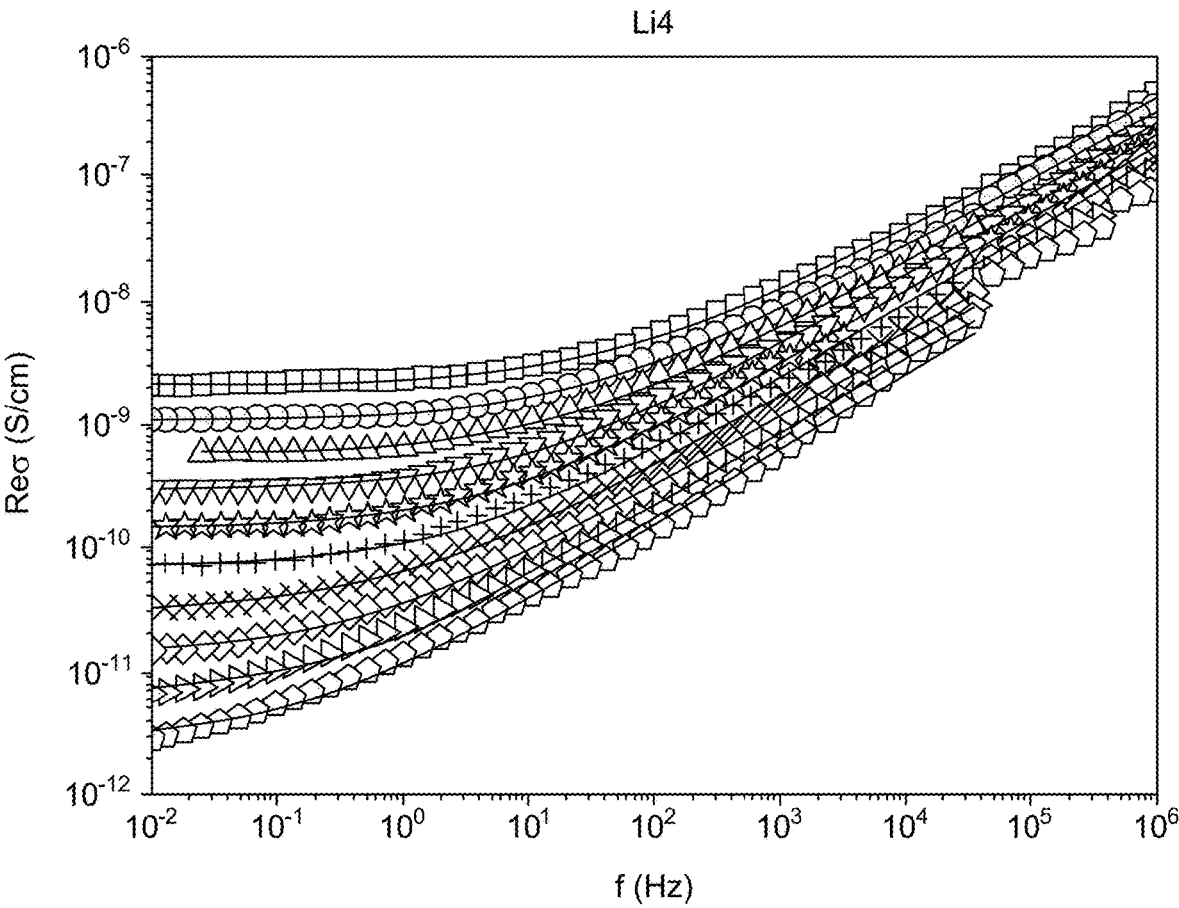
FIG. 6D depicts an AC conductivity spectrum for L4 with Jonscher's relation fit, according to certain embodiments.
Figure 6E:
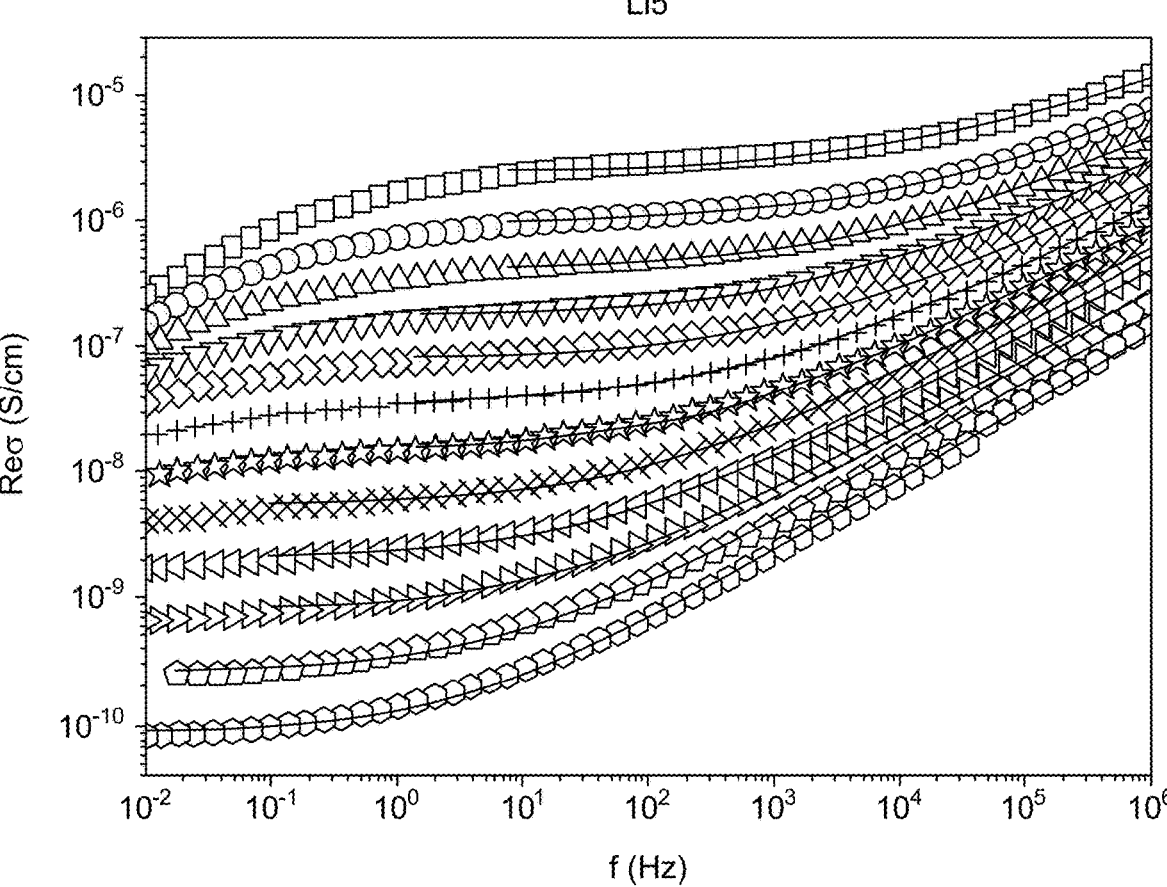
FIG. 6E depicts an AC conductivity spectrum for L5 with Jonscher's relation fit, according to certain embodiments.

FTIR spectra are shown in FIG. 5. In sample L1, the dominant phase is the amorphous Ca$_{7-8}$Al$_{15.1}$ Si$_{17.5}$O$_{56.5}$N$_{5.5}$ glass, confirmed by a broad, rounded band in the range of 800 to 1000 cm$^{-1}$, with a peak at ~930 cm$^{-1}$, attributed to the asymmetric stretching vibrations of Si—O bonds in Q2 silicate units. Smaller bands at approximately 836 cm$^{-1}$ and another at 1024 cm$^{-1}$ correspond to Si—O stretching in Q$^1$ and Q$^3$ silicate units, respectively. The band at 1155 cm$^{-1}$ can be assigned to Q$^4$ units within a SiO$_2$ framework, while the band around 680 cm$^{-1}$ is associated with AlO$_4$ polyhedra. Several smaller bands corresponding to crystalline phases are also visible in the spectrum. As the LLZTO content increases, numerous small bands appear in the spectra. In samples L2 and L3, a shift of the bands to higher wavenumbers and sharper peaks indicates an increased content of crystalline phases. Structural modifications are evident in samples L4 and L5, where IR spectra are dominated by crystalline phases, primarily related to silicon (Si) and aluminum (Al). According to the XRD analysis, the main crystalline phase in these samples is La$_2$Zr$_2$O$_7$, as reflected by the presence of sharp peaks in the FTIR spectra, consistent with the formation of the La$_2$Zr$_2$O$_7$ crystalline phase.

Example 3: Density and Thermal Properties

The density of LLZTO-doped glass-ceramic combinations is displayed in Table 1. The density value shows an increasing trend. The undoped glass pallet has a density of 2.45 g/cm$^3$, once doped with 15% LLZTO, its density increases to 2.8 g/cm$^3$. This trend continues as the doping amount increases. The density reaches 3.92 g/cm$^2$ for the L5 sample. Given that the theoretical density of LLZTO is 5.4 g/cm$^3$, due to the presence of high atomic weight materials like lanthanum, zirconia, and tantalum, it is observed that as the amount of LLZTO increases in the sample, the density of the entire composite increases.

In the subsequent phase, thermal conductivity of the samples was evaluated. Thermal conductivity of the pristine glass pellet, subsequent to the synthesis process, was 1.39 W/m·K. Upon the introduction of LLZTO doping (L1), the thermal conductivity increased to 1.69 W/m·K. A minor reduction in thermal conductivity was observed following further doping, with the thermal conductivity value for L5 measuring 1.61 W/m·K. Crystals exhibiting long-range order demonstrate elevated thermal conductivity. The augmented thermal conductivity, which approaches that of a glass medium within solid electrolytes, can enhance heat dissipation in solid-state batteries. Thermal expansion values are provided in Table 1. The presence of voids impacts thermal expansion behavior in glass ceramics and/or disintegration of bonds formed by constituents present in the composite. The thermal expansion coefficients listed in Table 1 illustrate an increase from 4.3 (ρμm/° C.) for L0 to 5.4 (ppm/° C.) for L2, the latter representing the highest thermal expansion coefficient among all samples. There is a slight decline (4.9 ppm/° C.) for sample L5. An increase in thermal expansion values is observed following the incorporation of LLZTO doping. Thermal conductivity (TC) values showed a slight increase after doping LLTZO into the glass matrix, which led to the formation of various crystallite phases following the SPS process. This alteration affects the thermal properties of both the original and composite samples. The TC of the SPS glass sample was lower compared to that of the doped sample. This difference is due to an increased interfacial area and the presence of voids that disrupt the thermal flow. Additionally, transport phenomena occurring at the interfaces results in new phases and precipitates that further influence TC, which are affected by factors such as interfacial resistance and voids. Formation of voids during the SPS process and subsequent cooling also has an impact on thermal expansion, which is subject to variation based on preparation methods. The SPS prepared samples displayed non-linear thermal expansion characteristics, with density increasing alongside higher dopant levels. This behavior highlights the relationship between composition, processing techniques, and the resulting material properties.

Example 4: Conductivity and Impedance Spectra Analysis

FIGS. 6A-6E present electrical conductivity studies conducted over various frequencies and temperatures for samples L1, L2, L3, L4, and L5. The spectra of the real part of conductivity display characteristic behavior typical of semiconductors. At low frequencies, a DC region, independent of frequency, can be distinguished, while an AC region shows a logarithmic increase in conductivity with frequency. As the LLZTO content increases, a general trend of enhanced conductivity is observed. For sample L1, DC conductivity is noticeable only at higher temperatures (above 343 K) and frequencies below 1 Hz. In contrast, for sample L5, a strong dominance of DC conductivity is observed across the entire frequency range. At the highest temperatures and lowest frequencies, a decrease in conductivity is noted, which is typical of charge accumulation at electrodes or grain boundaries. This process leads to the formation of a double layer at grain boundaries, where ions are restricted in their movement, resulting in increased polarization and, consequently, reduced conductivity. The presence of this process indicates that the conduction mechanism is primarily governed by ionic transport. Frequency dependence of the real part of conductivity in ionic semiconductors is well described by Jonscher's relation, Reσ=σ$_{DC}$+σ$_{AC}$. In this equation, σ$_{DC}$ represents the DC conductivity, which is independent of frequency. σ$_{AC}$ exhibits a strong frequency dependence, described by the formula Aω$^{s(T)}$, where to =2πf, with f representing frequency and s being a temperature-dependent parameter. Conductivity spectra were analyzed using this relation, with the fitting results shown in FIGS. 6A-6E as solid lines. Jonscher's relation describes the data with reasonable agreement. The relation does not account for electrode effects related to ion accumulation; therefore, this region was excluded from the analysis for the L5 sample. Fitting was performed using weighted regression to enhance the accuracy of the fit. This approach was used due to experimental data spanning eight orders of magnitude in frequency and approximately six orders of magnitude in conductivity variations. The resulting fits yielded an adjusted R$^2$ value of approximately 0.996, and DC conductivity values were extracted for the temperature range in which this region was observed for each sample. These values are presented as a function of the inverse temperature in FIG. 7A. DC conductivity increases with the addition of LLZTO, initially rising by approximately one and a half orders of magnitude between samples L1 and L2, followed by an increase of one order of magnitude for sample L3. Further addition of LLZTO leads to a decrease in conductivity, as seen for sample L4. For sample L5, the DC conductivity reaches its highest value, exceeding 10$^{-6}$ S/cm at 140° C. At 25° C., DC conductivity is approximately 10$^{-10}$ S/cm. Given the linear temperature dependence of the DC conductivity for the samples, it was analyzed using the Arrhenius relation, commonly used for thermally activated processes. The relationship is expressed as: σ$_{DC}$T=σ$_0$+exp (−E$_A$/kT), where k is the Boltzmann constant, E$_A$ is the activation energy, T is the absolute temperature, and σ$_0$ is the pre-exponential factor, which represents the conductivity at an infinitely high temperature. By fitting the experimental conductivity data to this equation, activation energy for each sample was determined. Activation energy values obtained decreased from 0.91 eV for the L1 sample to 0.81 eV for L2 and reached the lowest value of 0.78 eV for the L3 sample. Subsequently, activation energy increased for the L4 sample to 0.88 eV and further to 0.99 eV for L5. Such high values are typical for ionic transport.

Figures 7A, 7B:
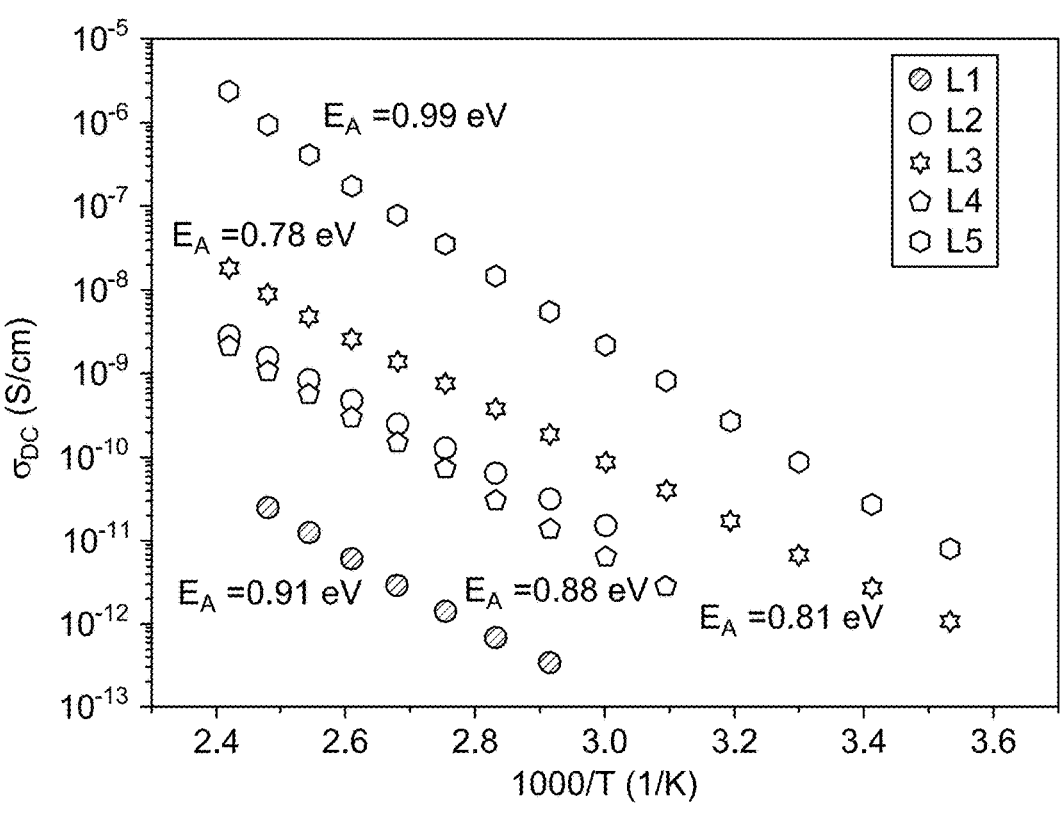
FIG. 7A depicts direct current (DC) conductivity spectra for L1-L5, according to certain embodiments.
FIG. 7B is a graph depicting a parameter S vs temperature for L1-L5, according to certain embodiments.

To gain a deeper understanding of the ionic transport mechanism, the behavior of the s parameter, presented in FIG. 7B as a function of temperature, was analyzed. The s parameter provides insights into the conduction process and identifies dominant transport mechanisms in materials, particularly in ion-conducting glass-ceramics, amorphous electrolytes, and solid-state lithium conductors such as LLZTO. In the context of ionic conductivity, analyzing the temperature dependence of s allows for differentiation between various transport mechanisms. Data shown in FIG. 7B demonstrates that the parameter s decrease slightly with increasing temperature for all samples, indicating a transition from tunneling-dominated transport to hopping-dominated transport. Quantum mechanical tunneling (QMT) is observed in materials with very low conductivity, where ionic motion is highly restricted and tunneling dominates. Correlated barrier hopping (CBH) is characteristic of materials with moderate ionic conductivity, where ions move between localized energy sites via thermally assisted hopping. This trend aligns with thermally activated ion conduction, where energy barriers for ionic migration become less at higher temperatures. The behavior of s is also influenced by the composition of the samples. In samples with lower LLZTO content (e.g., L1 and L2), s remains relatively high, indicating stronger structural constraints and reduced ionic mobility. In contrast, for the sample with the highest LLZTO content (L5), s is lower, reflecting a more favorable environment for ionic hopping due to the dominant crystalline content and improved ion transport pathways. For samples L3 and L4, despite the higher LLZTO content, slight reductions in the s value are observed compared to L5.

Comparing parameters describing phases incorporated into the base material with the crystalline phases that form after sintering occurs when analyzing the conductivity and activation energy values. The dopant, LLZTO, exhibits high ionic conductivity at room temperature (~25° C.), reaching $4.1 \times 10^{-2}$ S/cm. This high conductivity is attributed to the migration of lithium ions through its crystal structure; however, given the lower conductivity values observed in the tested materials, this phase is not responsible for the conduction process in these materials. A comparison of the electrical conductivity of the crystalline phases identified in the X-ray diffractograms, including $ZrSiO_4$, $La_2Zr_2O_7$, $LaTaO_4$, $LiAlO_2$, and $LiAlSi_3O_8$, at room temperature (RT) and up to 150° C. reveals that these materials are predominantly electrical insulators; however, some display measurable conductivity due to specific conduction mechanisms. $La_2Zr_2O_7$ exhibits the highest electrical conductivity among these phases at 25° C. ($\sigma \sim 10^{-9}$-$10^{-8}$ S/cm), attributed to oxide-ion conduction. $LiAlSi_3O_8$ ($\sigma \sim 10^{-10}$ S/cm at 25° C.) and $LiAlO_2$ ($\sigma \sim 10^{-12}$ S/cm at 25° C.) can also exhibit lithium-ion conduction, with conductivity increasing under specific conditions such as in the amorphous phase or doped variants. In contrast, $ZrSiO_4$ and $LaTaO_4$ remain the most effective insulators ($\sigma < 10^{-12}$ S/cm at 25° C.), showing negligible conductivity even at elevated temperatures. A comparison of these results with documented electrical properties of formed crystalline phases indicates that the $ZrSiO_4$ and $LaTaO_4$ phases do not influence the conduction process. The remaining phases, to varying extents, can contribute to ion transport observed in glass-ceramics. The conduction process is predominantly governed by the $La_2Zr_2O_7$ phase, along with $LiAlSi_3O_8$, which is evident in the L2 and L3 samples. The glass matrix is an insulator and does not exhibit measurable conductivity at the tested temperatures; however, due to the reaction with the added LLZTO, lithium ions, which may be mobile within the glass, may diffuse into the matrix. While the observed increase in conductivity and the corresponding decrease in activation energy between the L1 to L3 samples are strongly linked to the increasing content of crystalline phases, contributing to ion transport, it remains unclear what occurs when the LLZTO dopant becomes the dominant phase in the L4 sample. The subsequent decrease in conductivity and the associated increase in activation energy strongly indicate the presence of a supersaturation limit or excessive densification within the glass-ceramic structure, leading to partial blocking or hindrance of ion transport. This effect may result from a reduction in the number of percolation pathways for lithium-ion migration or the formation of less conductive interfacial regions between the crystalline and amorphous phases. In the L4 sample, a partial disappearance of the reflection associated with the $LiAlSi_3O_8$ phase (as shown in XRD FIG. 2B) is observed, indicating an even greater dominance of the $La_2Zr_2O_7$ phase. Given that $LiAlSi_3O_8$ is a lithium-ion conductor, whereas the dominant $La_2Zr_2O_7$ phase facilitates oxygen-ion conduction, this shift in phase composition contributes to the observed increase in activation energy. Lithium ions, being smaller and more mobile than oxygen vacancies, exhibit a lower activation energy for transport. Lithium-ion conduction occurs via a hopping mechanism, which allows for facile migration. In contrast, oxygen vacancy conduction requires structural rearrangements, resulting in a higher energy barrier for ion transport. Consequently, materials that rely on lithium conduction tend to be more effective at low temperatures compared to those that utilize oxygen vacancy transport. This explains the further increase in activation energy observed for the L5 sample. Despite this increase in activation energy, the L5 sample shows an additional rise in conductivity. In this case, the dominance of the $La_2Zr_2O_7$ phase becomes even more pronounced, indicating that other factors, such as improved percolation pathways or phase interactions, can contribute to enhanced overall conductivity.

Figure 8A:
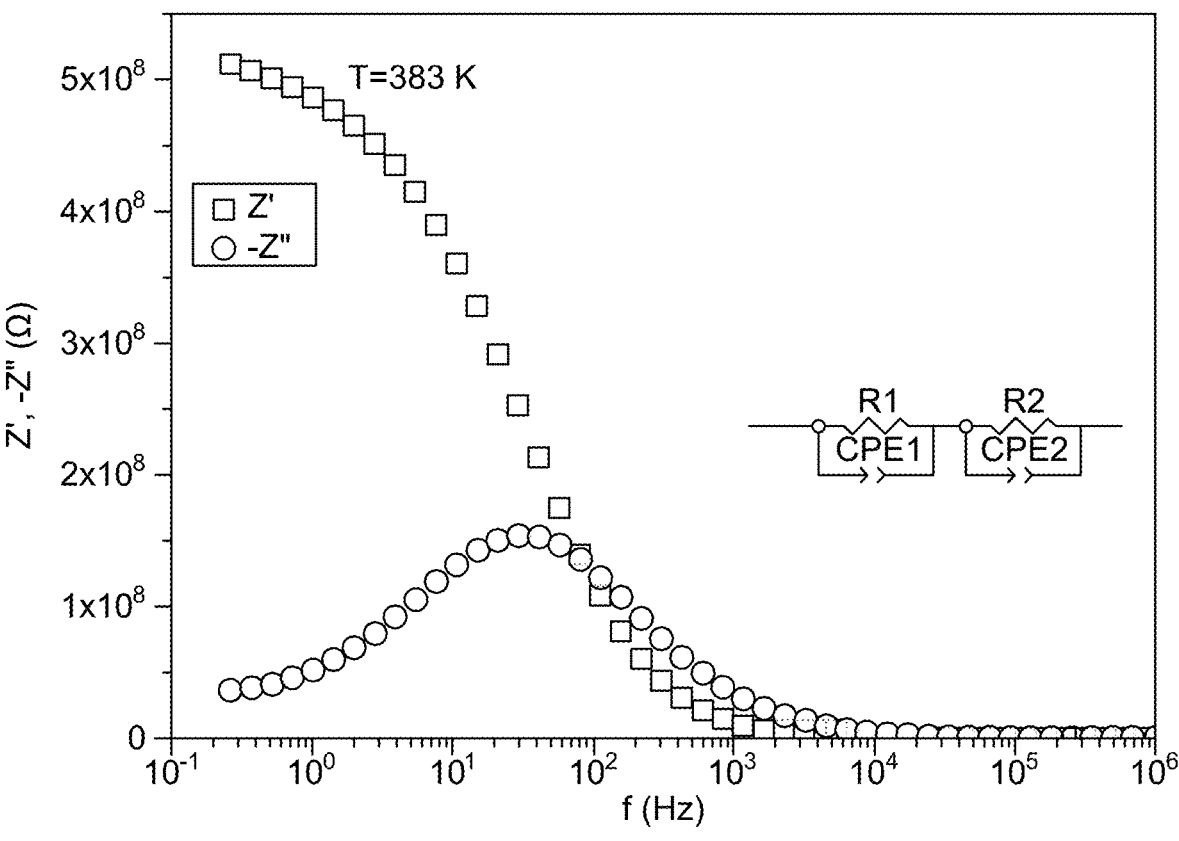
FIG. 8A is a graph depicting real and imaginary impedance vs. frequency parts at 383 K for L3 and an equivalent circuit used, according to certain embodiments.
Figure 8B:
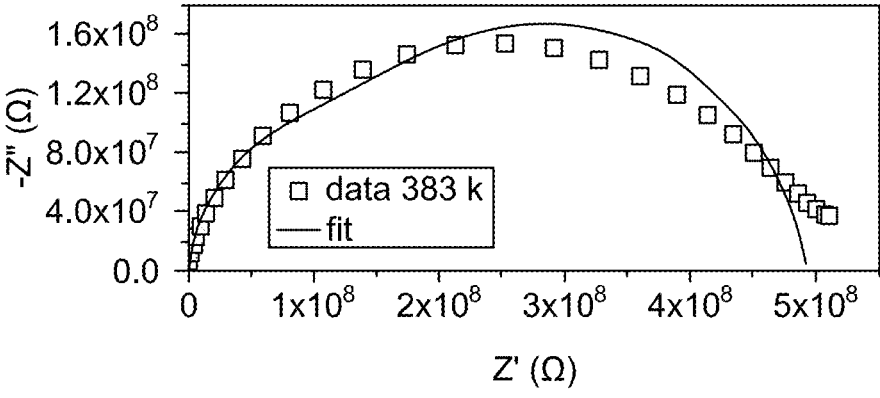
FIG. 8C is a graph depicting real and imaginary impedance vs. frequency parts at 383 K for L5 and an equivalent circuit used, according to certain embodiments.
FIG. 8D depicts a Nyquist plot for L5 at 383 K with fitting results, according to certain embodiments.
Figure 8C:
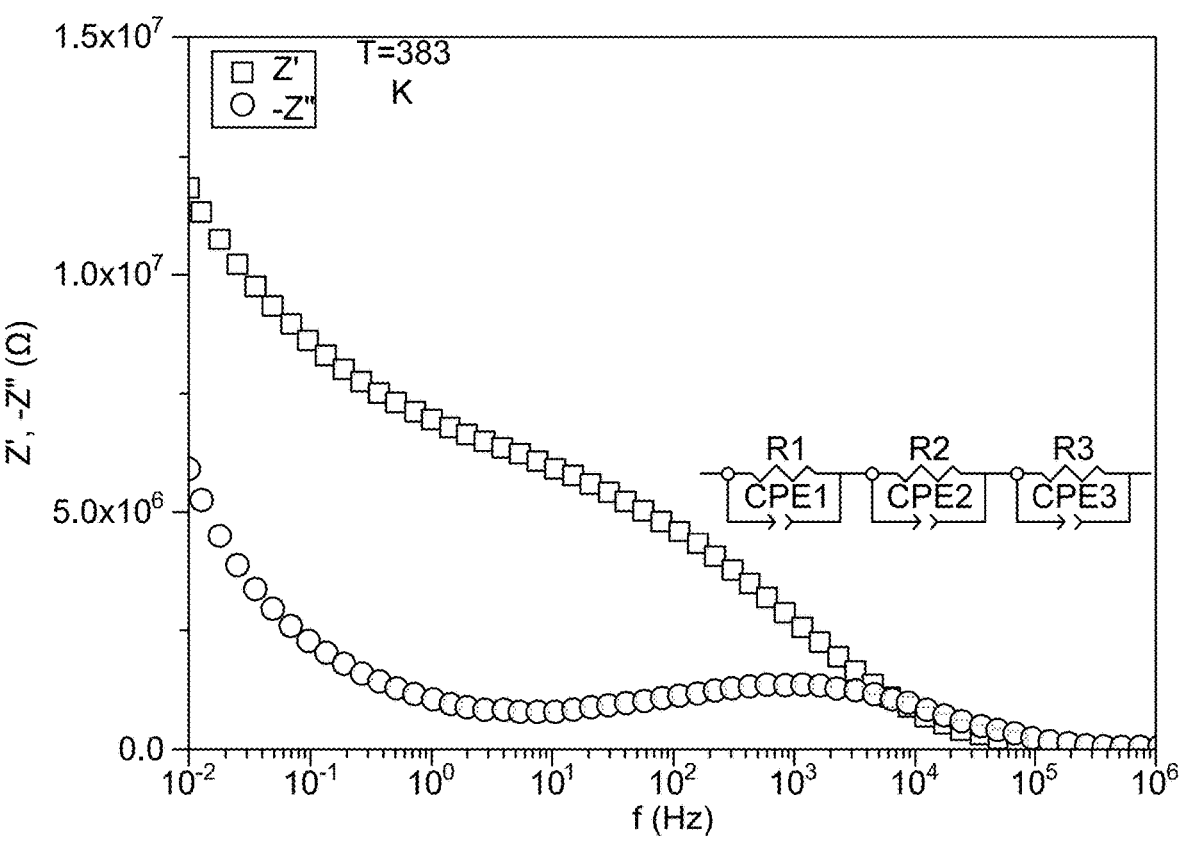
Figure 8D:
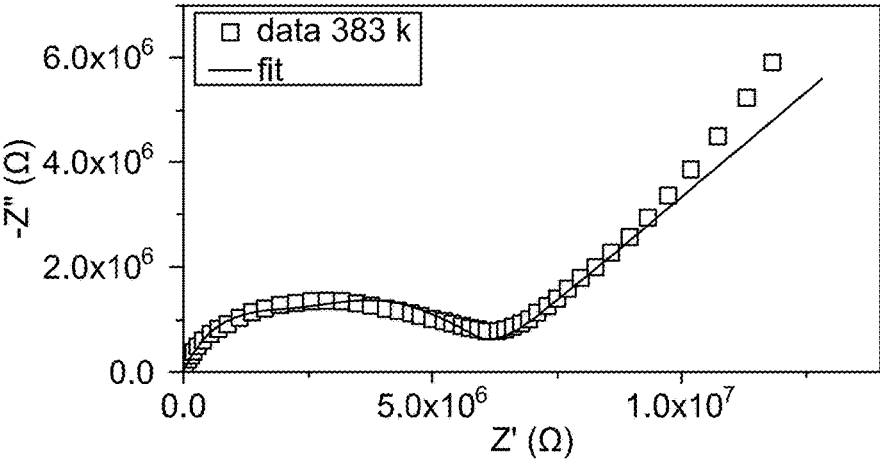

To further investigate conduction processes in the samples, impedance analysis was performed. FIGS. 8A-8D compare frequency dependence of real and imaginary components of impedance for the L3 (FIGS. 8A-8B) and L5 (FIGS. 8C-8D) samples at a temperature of 383 K. For the L3 sample, the imaginary part of the impedance exhibits a broad, asymmetric, and flattened maximum, accompanied by a sharp increase in the real part of the impedance. This behavior is indicative of a relaxation process or, more likely, two overlapping relaxation processes. These two processes are more seen in the Nyquist plot (FIG. 8B), where two semicircles are observed: a smaller one at higher frequencies and a larger one at lower frequencies, confirming the presence of two partially overlapping relaxation mechanisms. A similar behavior was observed in the other samples and at different temperatures. For the L5 sample, an additional increase in both impedance components is observed in the lowest frequency range, attributed to the electrode effect. This effect is visible as a rising line in the Nyquist plot, characteristic of ion accumulation at the electrode interface. To analyze the observed processes, an equivalent circuit consisting of a resistor (R) and a constant phase element (CPE) connected in parallel was employed. This circuit represents a single relaxation process, and its impedance can be expressed by the following formula: $Z=R/[1+RQ(j\omega)^n]$, where R is the resistance, Q is the CPE parameter, n is the exponent describing the non-ideal capacitive behavior $(0\leq n\leq1)$, $\omega$ is the angular frequency, and j is the imaginary unit. In the specific case where n=1, the CPE behaves like a capacitor with a capacitance C=Q. The individual relaxation processes were modeled by connecting these parallel R-CPE circuits in series, enabling the simulation of multiple overlapping relaxation mechanisms. FIG. 8C also illustrates the equivalent circuits used for the analysis. For the L5 sample, three semicircles were considered to achieve the best fit to the experimental data, with the electrode effects treated as the onset of a new process; however, these electrode effects are excluded from the subsequent analysis. The fitting process provided values for $R_1$ (the higher-frequency process) and $R_2$ (the lower-frequency process) for each sample, which were then converted into conductivity based on the sample dimensions.

Figure 9A:
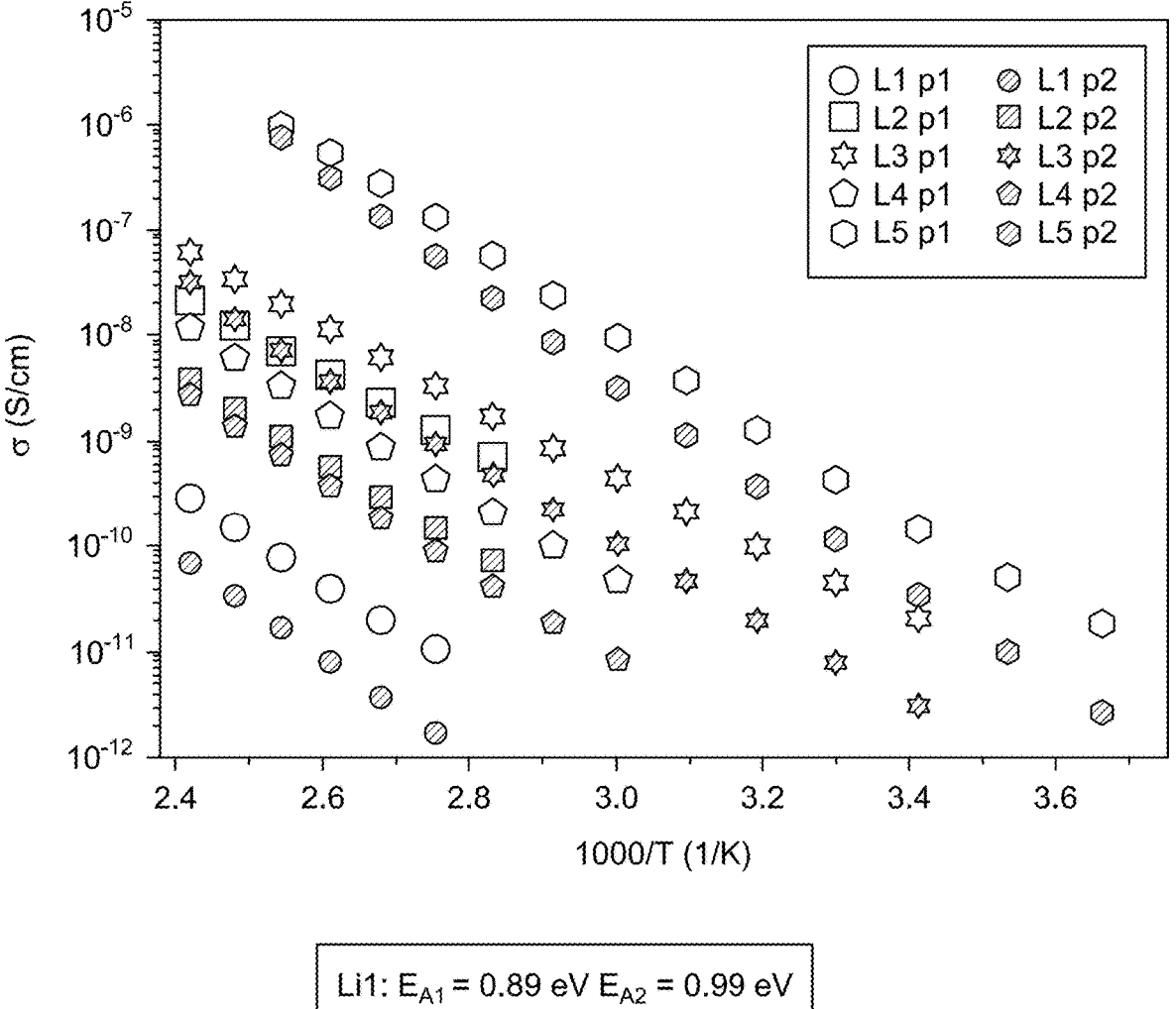
FIG. 9A is a graph depicting conductivity obtained from fitting Nyquist plots as a function of temperature, according to certain embodiments.

Conductivity values for the two processes are presented in FIG. 9A as a function of inverse temperature, along with the corresponding activation energies. Process $p_1$ exhibits higher conductivity and is generally associated with lower activation energy than process $p_2$ for each sample. A similar trend is observed across the samples, as seen in DC conductivity, with $E_{A1}$ being lower and $E_{A2}$ higher compared to the DC process. This occurs because the DC process represents the sum of all conduction mechanisms in the sample and is dominated by the slowest mechanism.

Figure 9B:
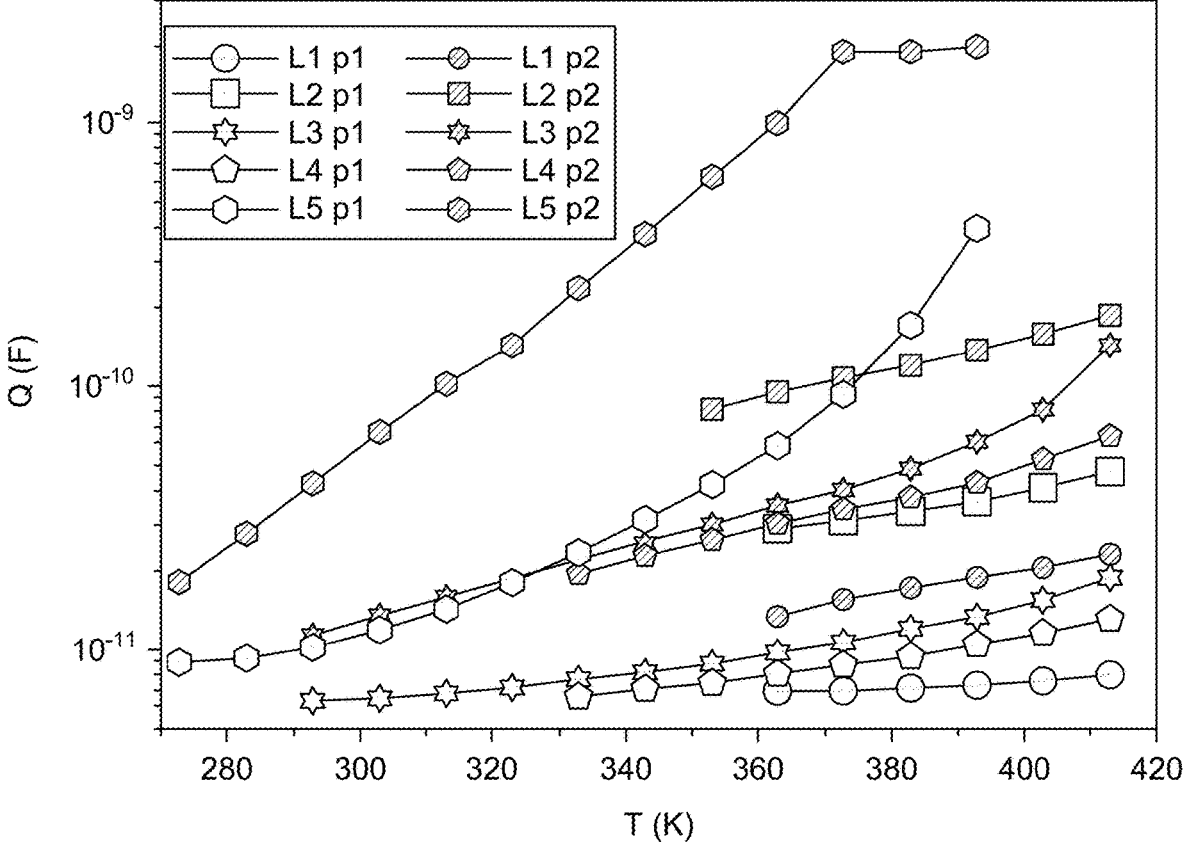
FIG. 9B is a graph depicting parameter Q describing a CPE element, according to certain embodiments.
Figure 9C:
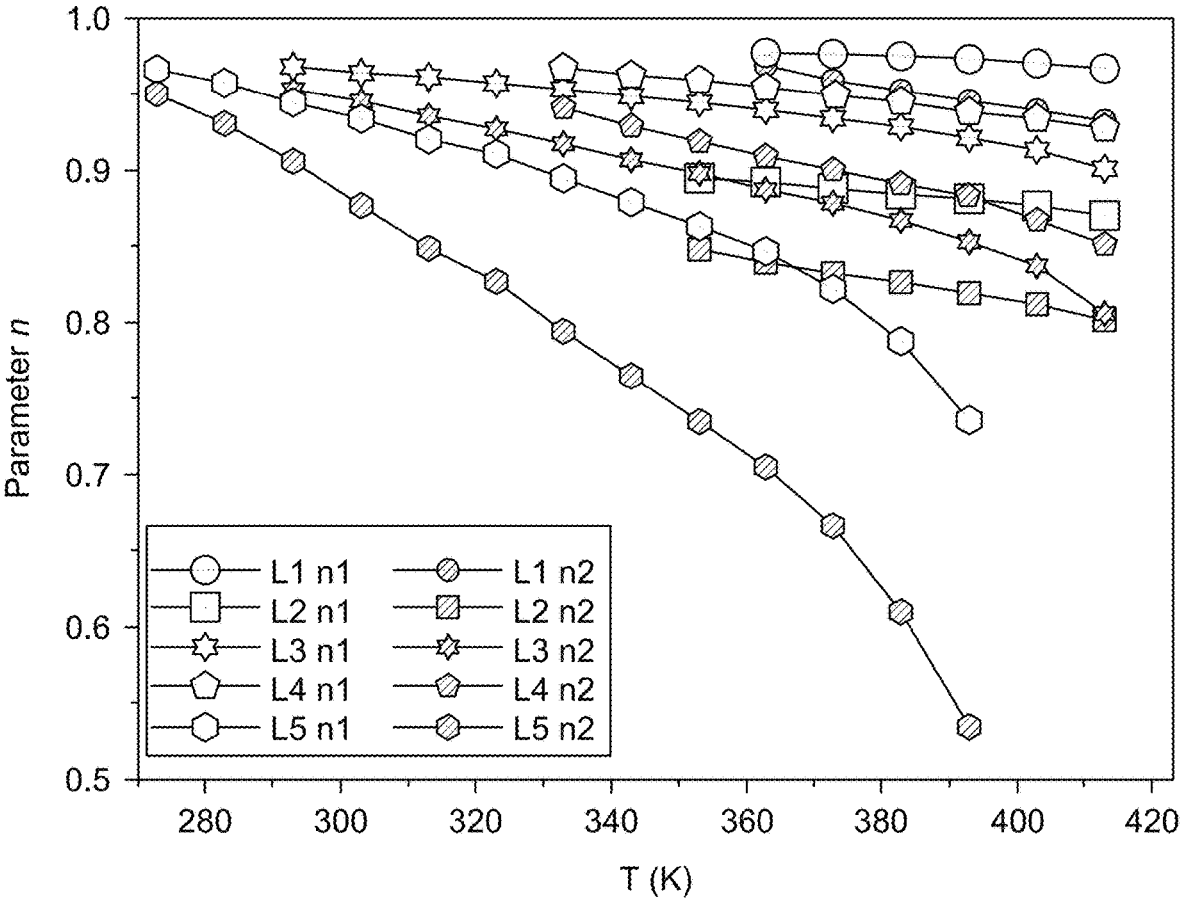
FIG. 9C is a graph depicting a CPE exponent, n, summarized for L1-L5, according to certain embodiments.

FIG. 9B presents the Q parameter, while FIG. 9C shows the n exponent as a function of temperature for the observed processes. In polycrystalline ceramics, the n exponent provides insight into the conduction region. A higher n value indicates that the process occurs in a more ordered region, such as the grain interior, where the distribution of relaxation times is narrower and charge transport follows a more uniform capacitive-like behavior. In contrast, a lower n value indicates conduction in more disordered regions, such as grain boundaries or amorphous phases, where a broader distribution of relaxation times arises due to structural heterogeneities, potential barriers, and interfacial effects that hinder charge transport. Comparing the two processes, it is evident that $p_1$ occurs in a phase with higher conductivity, corresponding to the crystalline phase of the material. Lower Q values indicate that capacitive effects do not limit conductivity, while the higher n values indicate a response that resembles classical capacitive behavior. In contrast, $p_2$ is associated with conduction through a second, less conductive phase or across grain boundaries. Higher Q values indicate stronger charge accumulation effects and the presence of more barriers, while the lower n values indicate greater energy losses, which may be due to potential barriers or carrier trapping. In L1, L2, and L3, the dominant conduction mechanism is $Li^+$ conduction (process $p_1$), leading to an increase in conductivity and a lower activation energy. $La_2Zr_2O_7$ is the dominant phase in all samples; therefore, lithium-ion transport occurs within the $LiAlSi_3O_8$ phase, which is more abundant in these compositions (L1-L3). As the material composition evolves in L4, there is a transition to the dominance of $0^{2-}$ conduction (process $p_2$), resulting in an increase in activation energy and a decrease in conductivity, coinciding with a reduction in the content of $LiAlSi_3O_8$. In L5, $O^{2-}$ conduction remains the primary transport mechanism; however, improvements in the ion transport structure lead to an increase in conductivity, although activation energy remains high.

The temperature-dependent transition from quantum mechanical tunneling to hopping-dominated transport, particularly in highly doped samples ($L_5$), constitutes a discovery that provides insights into ion mobility and conduction pathways. The vanishing of the $LiAlSi_3O_8$ phase and the predominance of the $La_2Zr_2O_7$ phase at elevated doping levels facilitates oxygen-ion conduction. A method can be articulated for doping glass-ceramics with LLZTO to improve density, thermal conductivity, and thermal expansion, while concurrently increasing ionic conductivity for solid-state battery applications. The innovation involves the engineering of glass-ceramics with specific crystalline phases (such as $La_2Zr_2O_7$, $LaTaON_2$, etc.) to attain increased thermal and electrical properties through LLZTO doping and solution treatment processes. A comprehensive procedure for achieving a controlled transition from lithium-ion to oxygen-ion conductivity involves modifying LLZTO doping levels, resulting in enhanced performance for energy storage and transport applications. The present disclosure advocates for the advancement of glass-ceramic materials engineered for efficient heat dissipation and mechanical stability in solid-state batteries, leveraging the improved thermal conductivity and non-linear thermal expansion properties induced by LLZTO doping. Identification and application of two distinct relaxation processes ($Li^+$ conduction and grain boundary conduction) elevate ionic transport efficiency in glass-ceramic materials. A synthesis process is utilized, encompassing controlled doping, synthesis, and phase stabilization to achieve a balance between high conductivity and structural integrity, with a focus on advanced energy applications.

X-ray analysis of the parent glass ($Ca_{7-8}Al_{15.1}Si_{17.5}O_{56.5}N_{5.5}$) and undoped sample (L0) synthesis via SPS reveals an amorphous structure. As the LLZTO content increased (L1 to L5), distinct crystalline phases emerged, including lanthanum zirconium oxide ($La_2Zr_2O_7$), lanthanum tantalum oxynitride ($LaTaON_2$), lithium aluminate ($LiAlO_2$), zirconium silicate ($ZrSiO_2$), and lithium aluminosilicate ($LiAlSi_3O_8$). X-ray analysis of the L1 sample, with the lowest LLZTO concentration, exhibited low-intensity, broad reflections, while higher doping concentrations (L2-L5) resulted in larger crystallites and more intense reflections. The dominant $La_2Zr_2O_7$ phase forms during heat treatment, driven by lithium evaporation and the formation of pyrochlore. Additional phases arise from the interaction between LLZTO and the surrounding glass, with crystallinity increasing from L1 to L5. SEM and energy-dispersive X-ray mapping confirmed a uniform distribution without segregation. FTIR spectra show that the L1 sample consisted of amorphous glass, with bands around 930 cm⁻ corresponding to Si—O stretching in silicate units. As LLZTO content increased, sharper peaks and shifts to higher wavenumbers were observed, particularly in L4 and L5, where $La_2Zr_2O_7$ became the dominant phase, consistent with the XRD results. LLZTO doping in glass-ceramics enhances density, thermal conductivity, and thermal expansion, with distinct trends observed at higher concentrations. Density increased from 2.45 g/cm³ in the undoped sample to 3.92 g/cm³ in L5, attributable to the high atomic weight elements in LLZTO. Thermal conductivity rose from 1.39 W/m·K in the undoped sample to 1.69 W/m·K in L1, before slightly decreasing to 1.61 W/m·K in L5. This increase is beneficial for heat dissipation in solid-state batteries. Thermal expansion increased from 4.3 ppm/° C. in the undoped sample to 5.4 ppm/° C. in L2, then slightly decreased to 4.9 ppm/° C. in L5. Voids and bond breakdown during synthesis influenced thermal expansion. The increase in non-linear expansion and density with higher LLZTO doping underscores the complex relationship between composition, processing, and material properties. Impedance analysis shows a trend of enhanced conductivity with increasing LLZTO content, particularly in L5, where DC conductivity dominates across the frequency range. The decrease in conductivity at high temperatures and low frequencies indicate charge accumulation effects at electrodes or grain boundaries, characteristic of ionic conduction. DC conductivity data show a decrease in activation energy from L1 to L3, indicating improved conductivity with higher LLZTO content; however, in L4, a rise in activation energy and a decrease in conductivity indicate that supersaturation or densification hinders ion transport. This is confirmed by the disappearance of the $LiAlSi_3O_8$ phase in XRD, with the $La_2Zr_2O_7$ phase becoming dominant, which facilitates oxygen-ion conduction.

Temperature dependence of the conductivity a reveals a transition from quantum mechanical tunneling to hopping-dominated transport, particularly in L5, where improved ion mobility and conduction pathways are observed. Impedance analysis identified two relaxation processes: $p_1$, associated with $Li^+$ conduction, and $p_2$, linked to conduction through grain boundaries or less conductive phases. These results demonstrate that lithium-ion conduction dominates in L1-L3, while oxygen-ion conduction prevails in L4 and L5, resulting in changes to activation energy and conductivity. Increasing LLZTO content in $Ca_{7-8}Al_{15.1}Si_{17.5}O_{56.5}N_{5.5}$ transforms the structure from amorphous to crystalline, with $La_2Zr_2O_7$ as the dominant phase. Higher LLZTO concentrations improve density and thermal conductivity, peaking in L5, making it suitable for solid-state batteries. Impedance analysis shows enhanced ionic conductivity and a transition to hopping transport in L5, indicating better ion mobility. These results highlight the complex relationship between composition and material properties for energy storage applications.

Numerous modifications and variations of the present disclosure are possible in light of the above teachings. It is therefore to be understood that within the scope of the appended claims, the disclosure may be practiced otherwise than as specifically described herein.

The invention claimed is:

1. An oxynitride ceramic material, comprising:
a $Ca_{7-8}Al_{15-15.5}Si_{17-18}O_{56-57}N_{5-6}$ material; and
a $Li_{6.4}La_3Zr_{1.4}Ta_{0.6}O_{12}$ material in an amount of 10 to 80 percent by weight (wt. %) based on a total weight of the oxynitride ceramic material,
wherein the oxynitride ceramic material is crystalline and comprises phases including a lanthanum zirconium oxide ($La_2Zr_2O_7$) phase, a lanthanum tantalum oxynitride ($LaTaON_2$) phase, a lithium aluminate ($LiAlO_2$) phase, a zirconium silicate ($ZrSiO_2$) phase, and a lithium aluminosilicate ($LiAlSi_3O_8$) phase.

2. The oxynitride ceramic material of claim 1, wherein the oxynitride ceramic material has a density of 2.7 to 4 $g/cm^3$.

3. The oxynitride ceramic material of claim 1, wherein the oxynitride ceramic material has a thermal conductivity of 1.5 to 1.8 W/m·K.

4. The oxynitride ceramic material of claim 1, wherein the oxynitride ceramic material has a thermal expansion of 4.7 to 5.6 ppm/° C.

5. The oxynitride ceramic material of claim 1, wherein the oxynitride ceramic material has a first activation energy of 0.7 to 1 eV.

6. The oxynitride ceramic material of claim 1, wherein the oxynitride ceramic material has a second activation energy of 0.8 to 1.1 eV.

7. The oxynitride ceramic material of claim 1, wherein the oxynitride ceramic material comprises nodules having a diameter of 0.1 to 5 μm and voids having a length of 5 to 50 μm.

8. The oxynitride ceramic material of claim 1, wherein ions are transported within the oxynitride ceramic material via correlated barrier hopping.

9. The oxynitride ceramic material of claim 1, wherein the oxynitride ceramic material comprises the $La_2Zr_2O_7$ phase in an amount of at least 20 wt. % based on a total weight of the phases.

10. The oxynitride ceramic material of claim 1, wherein the oxynitride ceramic material comprises the $Li_{6.4}La_3Zr_{1.4}Ta_{0.6}O_{12}$ material in an amount of 75 wt. % based on a total weight of the oxynitride ceramic material.

11. The oxynitride ceramic material of claim 10, wherein the oxynitride ceramic material has a density of 3.8 to 4 $g/cm^3$.

12. The oxynitride ceramic material of claim 10, wherein the oxynitride ceramic material has a thermal conductivity of 1.5 to 1.7 W/m·K.

13. The oxynitride ceramic material of claim 10, wherein the oxynitride ceramic material has a thermal expansion of 4.8 to 5 ppm/° C.

14. The oxynitride ceramic material of claim 10, wherein the oxynitride ceramic material has a first activation energy of 0.85 to 0.95 eV.

15. The oxynitride ceramic material of claim 10, wherein the oxynitride ceramic material has a second activation energy of 0.97 to 1.07 eV.

16. The oxynitride ceramic material of claim 1, wherein the oxynitride ceramic material is made by a process comprising:
mixing the $Ca_{7-8}Al_{15-15.5}Si_{17-18}O_{56-57}N_{5-6}$ material and the $Li_{6.4}La_3Zr_{1.4}Ta_{0.6}O_{12}$ material with a probe sonicator for 30 to 90 minutes to form a homogenous mixture; and
sintering the homogeneous mixture in a die at a temperature of 850 to 950° C. for 20 to 40 minutes to form the oxynitride ceramic material,
wherein the sintering is spark plasma sintering,
wherein a heating rate during the sintering is 80 to 120° C./min.

17. The oxynitride ceramic material of claim 16, wherein the die is pressurized to to 35 MPa.

18. The oxynitride ceramic material of claim 16, wherein the die is placed in a vacuum having a pressure of $4\times10^{-2}$ to $5\times10^{-2}$ mbar during the sintering.

19. The oxynitride ceramic material of claim 16, further comprising:
melting and casting $Ca_{7-8}Al_{15.1}Si_{17.5}O_{56.5}N_{5.5}$ at a temperature of 1600 to 1700° C. to form a $Ca_{7-8}Al_{15.1}Si_{17-8}O_{56.5}N_{5.5}$ glass before the mixing.

20. The oxynitride ceramic material of claim 19, further comprising:
ball-milling the $Ca_{7.5}Al_{15.1}Si_{17-8}O_{56.5}N_{5.5}$ glass for 4 to 8 hours to form the $Ca_{7.5}Al_{15.1}Si_{17.5}O_{56.5}N_{5.5}$ material before the mixing,
wherein the $Ca_{7.5}Al_{15.1}Si_{17-8}O_{56.5}N_{5.5}$ material is a powder.

* * * * *